United States Patent
Hamada et al.

(10) Patent No.: US 6,662,288 B1
(45) Date of Patent: Dec. 9, 2003

(54) ADDRESS GENERATING APPARATUS AND MOTION VECTOR DETECTOR

(75) Inventors: Mana Hamada, Fukuoka (JP); Shunichi Kuromaru, Fukuoka (JP); Tomonori Yonezawa, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/856,775

(22) PCT Filed: Nov. 26, 1999

(86) PCT No.: PCT/JP99/06626
§ 371 (c)(1),
(2), (4) Date: Jun. 27, 2001

(87) PCT Pub. No.: WO00/33194
PCT Pub. Date: Jun. 8, 2000

(30) Foreign Application Priority Data

Nov. 27, 1998 (JP) ............................................. 10-338083

(51) Int. Cl.[7] .............................................. G06F 12/08
(52) U.S. Cl. ...................... 711/201; 711/217; 711/218; 711/173
(58) Field of Search ................................ 345/536, 572, 345/561; 711/201, 217, 218, 173

(56) References Cited

U.S. PATENT DOCUMENTS 4,924,432 A   5/1990   Asai et al. .................. 345/540

FOREIGN PATENT DOCUMENTS

| JP | 63-271606 | 11/1988 |
| JP | 4-218847 | 8/1992 |
| JP | 5-334178 | 12/1993 |
| JP | 6-62390 | 3/1994 |
| JP | 8-202524 | 8/1996 |
| JP | 10-215457 | 8/1998 |
| JP | 2854420 | 11/1998 |

Primary Examiner—Kevin L. Ellis
Assistant Examiner—Midys Inoa
(74) Attorney, Agent, or Firm—Parkhurst & Wendel, L.L.P.

(57) ABSTRACT

A high-function address generating apparatus is realized which generates a memory address that can access a multidimensional area without running over a memory area specified by a user. Continuous addressing domain which is determined by a top address and a final address is set by an addressing domain setting means 101, an address is generated by a two-dimensional address generating means 106, the address in a two-dimensional area is compared with the final address and the top address by a first and a second comparing means 108 and 109, respectively, whether it runs over the addressing domain or not is judged by an address correction means 112, and an address running over is corrected so as to not run over.

11 Claims, 25 Drawing Sheets

|   | 0 | 1 | 2 | 3 | 4 | 5 |
|---|---|---|---|---|---|---|
|   | 6 | 7 (0) | 8 (1) | 9 (2) | 10 (3) | 11 |
|   | 12 | 13 (4) | 14 (5) | 15 (6) | 16 (7) | 17 |
|   | 18 | 19 (8) | 20 (9) | 21 (10) | 22 (11) | 23 |
|   | 24 | 25 (12) | 26 (13) | 27 (14) | 28 (15) | 29 |
|   | 30 | 31 | 32 | 33 | 34 | 35 |
|   | 36 | 37 | 38 | 39 | 40 | 41 |

|   | 0 | 1 | 2 | 3 | 4 | 5 |
|---|---|---|---|---|---|---|
|   | 6 | 7 (0) | 8 (4) | 9 (8) | 10 (12) | 11 |
|   | 12 | 13 (1) | 14 (5) | 15 (9) | 16 (13) | 17 |
|   | 18 | 19 (2) | 20 (6) | 21 (10) | 22 (14) | 23 |
|   | 24 | 25 (3) | 26 (7) | 27 (11) | 28 (15) | 29 |
|   | 30 | 31 | 32 | 33 | 34 | 35 |
|   | 36 | 37 | 38 | 39 | 40 | 41 |

| detection result 213 | | first comparison result 210 (Y) | second comparison result 211 (X) | input of address pointer 215 |
|---|---|---|---|---|
| sign bit of calculation result of formula 2-3 (S) | nearer to which of EA and SAO | | | |
| 0 | * | ON | OFF | correction address a |
| 0 | * | OFF | ON | correction address b |
| 0 | * | OFF | OFF | address of subsequent cycle |
| 1 | EA | OFF | OFF | correction address a' |
| 1 | SAO | OFF | OFF | correction address b' |
| 1 | * | OFF | ON | address of subsequent cycle |
| 1 | * | ON | OFF | address of subsequent cycle |

ADDRESS GENERATING APPARATUS AND MOTION VECTOR DETECTOR

TECHNICAL FIELD

The present invention relates to an address generating apparatus and a motion vector detecting apparatus and, more particularly, to an improved address generation mechanism to perform data memory access which is employed for reading/writing image data by a digital signal processor for image processing or the like, and an image data controlling apparatus which performs motion vector detection employing that mechanism.

BACKGROUND ART

In a signal processor handling image data and the like, an address generating apparatus which generates addresses of a two-dimensional rectangular area is employed as an address generating apparatus which can efficiently access a data memory This is because, while, for example, data arranged two dimensionally such as image data should be mapped in one-dimensional address space when they are to be stored into a memory, and generally, image data are generally mapped in one-dimensional addresses in the order in which the image data are raster scanned, in a case where these data are handled as two-dimensional data, a rectangular area is often cut out to be used.

As an address generating apparatus which generalizes this kind of address generating apparatus, there is one disclosed in Japanese Published Patent Application No. Hei. 4-218847, which can access to a multidimensional area in data memory, the configuration of which is illustrated in FIG. 18.

In FIG. 18, numerals 901-1 through 901-N denote incremental value setting means in first through Nth scanning directions, respectively, numeral 902 denotes a first multiplexer which selects one of the outputs of the incremental value setting means in the first scanning direction 901-1 through the incremental value setting means in the Nth scanning direction 901-N to output the same, numeral 903 denotes a start address setting means which sets an start address, numerals 904-1 through 904-N denote first through Nth cumulative registers which correspond to the first through Nth scanning directions, respectively, numeral 905 denotes a second multiplexer which selects one of the outputs of the first cumulative register 904-1 through Nth cumulative register 904-N to output the same, numeral 906 denotes an adder which adds the output of the first multiplexer 902 and the output of the second multiplexer 905, numeral 907 denotes a third multiplexer which selects one of the outputs of the adder 906 and the start address setting means 903 to output the same, numerals 908-1 through 908-N denote data number setting means in the first scanning direction through the Nth scanning direction, respectively, and numeral 909 denotes a control circuit which generates a control signal based on set values of the data number setting means 908-1 in the first scanning direction through the data setting means 908-N in the Nth scanning direction.

The multidimensional address generating apparatus configured as described above has the output of the first cumulative register 904-1 as an output address.

FIG. 19 is one having simplified the multidimensional address generating apparatus in FIG. 18 so that it can generate a two-dimensional address, and hereinafter, the operation of the multidimensional address generating apparatus in FIG. 18 will be described as referring to a case where a two-dimensional address is generated by this conventional two-dimensional address generating apparatus, for simplification.

First, suppose that a rectangular area of arbitrary P1×P2 (P1 and P2 are natural numbers such as 16 and 16, for example) is an access object. Initially, at 0th cycle, start address data SA is set to the first cumulative register 904-1 and the second cumulative register 904-2 as an initial value by a start address data setting device 903.

At a subsequent first cycle, data of the first cumulative register 904-1 and incremental data DX in the first scanning direction (direction X) are added by the adder 906 and the addition result is written into the first cumulative register 904-1, so as to generate an address immediately after the initial value. The writing is not performed to the second cumulative register 904-2. Subsequently, the same operation as that at the first cycle is performed from second cycle to P1−1th cycle to continue writing.

Next, at P1th cycle, data of the second cumulative register 904-2 and incremental data DY in the second scanning direction (direction Y) are added by the adder 906 and the addition result is written into both of the first cumulative register 904-1 and the second cumulative register 904-2.

Similarly, every other cycle from P1+1th cycle to 2P1−1th cycle, . . . , from (P2−1) P1+1th cycle to P2·P1−1th cycle, a control is performed so that the data of the first cumulative register 904-1 and the incremental data DX in the first scanning direction are added by the adder 906 and the result is written into the first cumulative register 904-1, and at every P1 cycle of P1th cycle, 2P1th cycle, . . . , (P2−1) P1th cycle, a control is performed so that the data of the second cumulative register 904-2 and the incremental data DY in the second scanning direction are added and the result is written into the first cumulative register 904-1 and the second cumulative register 904-2, thereby outputting a value of the first cumulative register 904-1 obtained as a result of carrying out the 0th cycle to the P2·P1−1th cycle as an address.

A data flow due to such operation will be described in FIG. 20. An initial address of a subsequent line is calculated employing an initial address of a previous row or column stored in the second cumulative register 904-2 as shown in FIG. 20.

An example of the control circuit 909 in FIG. 19 will be described in FIG. 21. In FIG. 21, numeral 909-1 denotes a first counter, an initial value of which is P1, and which repeats the operation of starting a count from 1 to sequentially increment to P1 according to a clock, numeral 909-3 denotes a second counter, an initial value of which is P2, and which repeats the operation of starting a count from 1 to sequentially increment to P2 according to a clock, numeral 909-2 denotes a data P1, numeral 909-4 denotes a data P2, numeral 909-11 denotes a data P1-1, numerals 909-5 and 909-8 denote AND circuits, numerals 909-6, 909-7, and 909-12 denote comparators which compare two data to output 1 when they match and to output 0 when they do not match, numerals 909-9, 909-10, and 909-13 denote D flipflops, numeral 909-14 denotes a first clock, numeral 909-15 denotes a second clock, numeral 909-16 denotes a control signal, and numeral 909-17 denotes an END signal.

The control circuit in FIG. 21 operates at a timing in FIG. 20. The control signal 909-16 is employed as a first control signal 29-1 and a second control signal 29-2 in figure 19, the first clock 909-14 is employed as a writing signal 29-4, and the second clock 909-15 is employed as a second writing signal 29-5, thereby performing a control following a timing chart in FIG. 22.

A third control signal 29-3 of a third multiplexer 917 in FIG. 19 performs a control so that a start address data of the start address data setting device 903 is selected at the activation of a two-dimensional address generating apparatus (at a 0th cycle), while an output address of the adder 906 is selected at other cycles.

An example of a state where actual image data are accessed will be described in FIG. 23. FIG. 23(*a*) is a schematic diagram illustrating an access in a lateral direction and FIG. 23(*b*) is a schematic diagram illustrating an access in a longitudinal direction.

First, the operation when an access is performed in a lateral direction will be described with reference to FIG. 23(*a*). Numeral 61 denotes a whole image data composed of a rectangular area of 6×7 pixels, and numeral 62 denotes an objective rectangular area to be accessed of 4×4 pixels. 0 to 41 denote actual addresses of a memory, and (0) to (15) represent an order of accessing the objective rectangular area to be accessed of 4×4 pixels out of addresses of the whole image data of 6×7 pixels. In this case, 1 is set as the incremental data DX in the first scanning direction and the data number 6 in a line is set as the incremental data DY in the second scanning direction.

At 0th cycle, 7 is written into the first cumulative register 904-1 and the second cumulative register 904-2 as the start address data SA. At each cycle from a first cycle to a third cycle, the incremental data DX in the first scanning direction (1 in this example) is sequentially added to the value 7 of the first cumulative register 904-1 to write the result thereinto, thereby generating addresses 8, 9, and 10.

At a fourth cycle, the incremental data DY in the second scanning direction (6 in this example) is added to the address 7 held in the second cumulative register 904-2 to write the result into the first cumulative register 904-1 and the second cumulative register 904-2, thereby generating an address 13. At each cycle from a fifth cycle to a seventh cycle, 1 is sequentially added to the value 13 of the first cumulative register 904-1 as the incremental data DX in the first scanning direction to write into the first cumulative register 904-1, thereby generating addresses 14, 15, and 16.

At an eighth cycle, 6 is added to the value 13 of the second cumulative register 904-2 as the incremental data in the second scanning direction to write the result into the first cumulative register 904-1 and the second cumulative register 904-2, thereby generating an address 19.

Hereinafter, addresses 20, 21, 25, 26, 27, and 28 are generated sequentially in the same way, thereby realizing an access of the objective rectangular area 62 to be accessed in the whole image data 61.

Next, the operation when an access is performed in a longitudinal direction will be described with reference to FIG. 23(*b*). Numeral 63 denotes a whole image data composed of a rectangular area of 6×7 pixels, and numeral 64 denotes an objective rectangular area to be accessed of 4×4 pixels. 0 to 41 denote actual addresses of a memory, and (0) to (15) represent an order of accessing.

In this case, 6 is set as the incremental data DX in the first scanning direction and the data number 1 in a line is set as the incremental data DY in the second scanning direction.

At 0th cycle, the value 7 is written into the first cumulative register 904-1 and the second cumulative register 904-2 as the start address data SA. At each cycle from a first cycle to a third cycle, the incremental data DX in the first scanning direction (6 in this example) is sequentially added to the value 7 of the first cumulative register 904-1 to write the result into the first cumulative register 904-1 and the second cumulative register 904-2. At each cycle from a first cycle to a third cycle, the incremental data DX in the first scanning direction (6 in this example) is sequentially added to the value 7 of the first cumulative register 904-1 to write the result thereinto, thereby generating addresses 13, 19, and 25.

At a fourth cycle, the incremental data DY in the second scanning direction (1 in this example) is added to the address 7 held in the second cumulative register 904-2 to write the result into the first cumulative register 904-1 and the second cumulative register 904-2, thereby generating an address 8. At each cycle from a fifth cycle to a seventh cycle, the incremental data in the first scanning direction 6 is sequentially added to the value of the first cumulative register 904-1 to write the result into the first cumulative register 904-1, thereby generating addresses 14, 20, and 26.

At an eighth cycle, 1 is added to the value 8 of the second cumulative register 904-2 as the incremental data in the second scanning direction to write the result into the first cumulative register 904-1 and the second cumulative register 904-2, thereby generating an address 9.

Hereinafter, addresses 15, 21, 27, 10, 16, 22, and 28 are generated sequentially in the same way, thereby realizing an access of the objective rectangular area 64 to be accessed in the whole image data 63.

As described above, when the access direction is to be changed toward the identical objective rectangular area 62 or 64 to be accessed, it is only required to replace the incremental data DX in the first scanning direction and the incremental data DY in the second scanning direction with each other. Further, by changing one or both of the incremental data in the first scanning direction and the incremental data in the second scanning direction, it is also possible to access a parallel body area or to access with jumping. When accessing a multidimensional space, a multidimensional parallelism area is accessed.

Meanwhile, in a case where data are subjected to DMA transfer from an external memory to a smaller amount data memory inside a processor to be stored therein, when the whole area of the external memory is attempted to be referred to, an area corresponding to the data memory should he scrolled, and this requires to perform DMA transfer of data corresponding to the amount of data memory each time. The amount of the data memory and the number of DMA transfer are in trade-off relationship, and there is a problem that when the amount of the data memory is to be reduced, the number of DMA transfer increases, and inversely, when the number of DMA transfer is to be reduced, the amount of the data memory increases.

Further, there is an image CODEC as an example of the image processing as described above, which is performed by an image processing apparatus having an address generating apparatus, and in an algorithm of the image CODEC, ME (motion vector detection) processing is generally employed. This ME processing comprises performing comparison of a luminance value of a 16×16-pixel image block (macro block; hereinafter referred to as MB) out of input images with a luminance value of a time-wise previous image employing an evaluation function of SAD (sum of absolute difference), and retrieving the most approximate image position, thereby obtaining the displacement. AS a kind of retrieval algorithm to perform the ME processing in a programmable way, there is "One at a time" algorithm.

In the "One at a time" algorithm, SAD calculation is performed with respect to eight adjacent macro blocks, which are shifted by pixels to left, right, up, down, diagonally to the upper right, diagonally to the lower right, diagonally to the upper left, and diagonally to the lower left, respectively from a retrieval origin as a comparison object (a macro block which has a starting point at an upper left corner of a rectangular memory area is a retrieval origin), and when there exist blocks that provide smaller SAD values than the SAD value of the retrieval origin, a macro block that provides the smallest SAD value thereamong is a new retrieval origin, and the same retrieval is repeated Until all the SAD values of the adjacent eight macro blocks are larger than or equal to the retrieval origin, thereby obtaining a motion vector.

When an algorithm such as that of the above-described "one at a time" is to be processed by a processor which is equipped with the conventional address generating apparatus described in FIG. 18, one is employed, as a method of locating pixel data for retrieving in a data memory, which comprises locating all the pixel data existing in a range to which retrieval could reach in the data memory at once and accessing a macro block of 16×16 pixels by a means for generating address in a two-dimensional area, thereby to perform retrieving. However, in a case where the maximal number of retrieval set by a user is, for example, 40 times, a pixel number required when retrieval reaches the maximal number of retrieval is 96×96 pixels, resulting in a problem that a large area which the processor directly uses is occupied in the data memory.

Further, as one which can reduce the amount of a memory corresponding to the data memory, there is a graphic display scroll device as disclosed in Japanese Published Patent Application No. Hei. 8-202524.

As shown in FIG. 25, when a display screen DS to be scrolled is to run over a display data area DA, this graphic display scroll device divides an area that is to run over by extension lines of the boundaries of the display data area DA, draws out these using area corresponding to areas in the display data area DA which are not used for storing the display screen DS, and reads out these, thereby enabling a smooth scroll even when the display data area DA is reduced to four of display screens DS, and resulting in a further reduction of the memory amount with relative to the above-mentioned method.

However, this prior art, attempts, when the display screen DS is to run over the display data area DA horizontally, for example, to the right side to move the running over area to the left-side area corresponding in the display data area DA, and in order to realize this horizontal movement, a judgement as to whether it runs over horizontally or not, or an arithmetic operations for address correction is required, resulting in an increase in the circuit scale or an increase in the processing time of a CPU. In addition, it is necessary for the display screen DS to be present in the display data area DA at first, and an area to run over is restricted to a two-dimensional rectangular area.

Further, when the retrieval range goes beyond a specific area determined by a user due to a movement of the retrieval origin in a case where an area in the data memory which is occupied by the ME processing is restricted to a searching range that is less than the maximal retrieval number, pixels which are newly required should be supplied by a DMA transfer. However, in order to perform a block access by a conventional two-dimensional address generating means, it is necessary to transfer all the search range including pixels newly required, thereby resulting in an increased transfer number at the DMA transfer.

The present invention is made to solve the above-mentioned problems of the conventional ones and has for its object to provide an address generating apparatus which can automatically generate an address of a multidimensional area which does not run over a restricted area in the data memory which is set by a user, needs fewer DMA transfer number, can solve a contradictory problem that the DMA transfer number should increase when an increase in the data memory area is suppressed, while the data memory area should increase when an increase in the DMA transfer number is suppressed, and can suppress an increase in the data memory area will neither increasing the circuit scale or CPU processing, nor restricting the existing position and configuration at the beginning of the running over area.

Further, it is an object of the present invention to provide an address generating apparatus with variety, which is not specialized only to the addressing for ME processing, as an address generating apparatus of a processor.

Further, it is an object of the present invention to provide a motion vector detector which, by employing such an address generating apparatus, can automatically generate an address in the multidimensional area, can solve the contradictory problem of an increase in the data memory area and an increase in the DMA transfer number, and can suppress an increase in the data memory area without causing an increase in the circuit scale or an increase in the CPU processing, thereby achieving an effect with respect to a motion vector detection processing.

DISCLOSURE OF THE INVENTION

To solve the above-described problems, according to claim 1 of the present invention, there is provided an address generating apparatus which comprises: an addressing domain setting means for setting a successive addressing area which is determined by a top address and a final address, the top address having a value smaller than that of the final address; a multidimensional address generating means which can successively generate addresses in a multidimensional area; a first comparing means for comparing respective addresses subsequently generated by the multidimensional address generating means with the final address; a second comparing means for comparing respective addresses subsequently generated by the multidimensional address generating means with the top address; and an address correction means for receiving the respective addresses subsequently generated by the multidimensional address generating means and the comparison results of the first and second comparing means as inputs, judging whether or not the respective addresses subsequently generated by the multidimensional address generating means should run over the addressing domain set by the addressing domain setting means, based on the comparison results of the first and second comparing means, and correcting the respective addresses so that they are located in a spiral annular space in the addressing domain to output the result when they run over, and outputting addresses of a subsequent cycle as they are when they do not run over.

According to this address generating apparatus, when a user sets an addressing domain in the memory where the top address shows a value smaller than that of the final address, addresses running over the addressing domain are corrected into the corresponding addresses in the addressing domain when the addressing domain is supposed to be a spiral annular space so as to be output, even when an addressing area set in the multidimensional address generating means includes outside of the addressing domain, thereby an automatic generation of addresses in the multidimensional area which do not run over a restricted area in the data memory set by a user can be realized, by a hardware, solving an contradictory problem of an increase in the data memory area and an increase in the DMA transfer number, and suppressing an increase in the data memory area without causing an increase in the circuit scale and in the CPU processing.

According to claim 2 of the invention, there is provided an address generating apparatus which comprises: an addressing domain setting means for setting a successive addressing area which is determined by a top address and a final address, regardless whether the value of the top address and the final address is large or small; a multidimensional address generating means which can successively generate addresses in a multidimensional area; a first comparing means for comparing respective addresses subsequently generated by the multidimensional address generating means with the final address; a second comparing means for comparing respective addresses subsequently generated by the multidimensional address generating means with the top address; an address detecting means for detecting to which of the top address and the final address, the address of a subsequent cycle is nearer based on the comparison result of the first comparing means and the comparison result of the second comparing means; and an address correction means for receiving the comparison results of the first and second comparing means, the output of the address detecting means, and the address of a subsequent cycle as inputs, judging whether or not the respective addresses subsequently generated by the multidimensional address generating means should run over the addressing domain set by the addressing domain setting means, based on the comparison results of the first and second comparing means and the output of the address detection means, and, correcting the respective addresses so that they are located in a spiral annular space in the addressing domain to output the result when they run over, while outputting addresses of a subsequent cycle as they are when they do not run over.

According to this address generating apparatus, in addition to that the address generation is realized as by the address generating apparatus of claim 1, there is no restriction, regarding the memory area which can be set as the addressing domain, that the top address must have a value smaller than that of the final value, thereby enabling setting of the addressing domain that strides the memory area, in which the top address shows a value larger than that of the final address, and solving a contradictory problem of an increase in the data memory area or in the DMA transfer number.

According to claim 3 of the invention, in the address generating apparatus as defined in claim 1 or 2, the addressing domain setting means is configured such that the addressing domain sets the final address and the total data number, and the top address is automatically generated by subtracting the total data number from the final address.

Therefore, in addition to that the reduction in the address generation is realized as by the address generating apparatus of claim 1 or 2, a correction calculation in the address correction means is simplified, resulting in reduction of the circuit scale.

According to claim 4 of the present invention, there is provided an address generating apparatus as defined in claim 1 or 2, wherein the multidimensional address generating means which can successively generate addresses in a multidimensional area comprises a means for setting a start address in a multidimensional area, incremental values in respective scanning directions, and data numbers in respective scanning directions and an independent cumulative register for accumulating addresses in respective scanning directions, and calculates an address value of a subsequent cycle by adding the incremental value corresponding to the scanning direction to the cumulative register corresponding to the scanning direction at an address calculation when the scanning direction is changed, to output the same, and updates the start address in the multidimensional area at a start cycle of addressing by the output of the address correction means.

Therefore, in addition to that the address generation is realized as by the address generating apparatus of in claim 1 or 2, in a case where the start address of a multidimensional space to be accessed is already outside the addressing domain, and thus an actual memory access is preformed with an address that is obtained by correcting the start address, the start address setting means is automatically set again to the corrected address employed for the actual access, whereby the amount of arithmetic operations required for address calculations by a program when a new addressing is performed based on the start address is reduced.

According to claim 5 of the invention, there is provided an address generating apparatus as defined in claim 1 or 2, wherein the multidimensional address generating means which can successively generate addresses in a multidimensional area comprises a data number setting means for setting a start address in a multidimensional area, incremental values in respective scanning directions, and data numbers in respective scanning directions and an independent cumulative register for accumulating addresses in respective scanning directions, and calculates an address value of a subsequent cycle by adding the incremental value corresponding to the scanning direction to the cumulative register corresponding to the scanning direction at an address calculation when the scanning direction is changed, to output the same, and among the cumulative registers for accumulating the addresses in respective scanning directions, a cumulative register in the lowest order scanning direction stores a corrected address outputted by the address correction means, while the other cumulative register stores one selected from the corrected address outputted by the address correction means and the address value of a subsequent cycle, and the output of the cumulative register storing an address in the lowest scanning direction is taken out as an output address.

With such configuration, in addition to that the address generation as by the address generating apparatus of claim 1 or 2, the corrected addresses are stored in the cumulative registers in respective scanning directions of the multidimensional address generating means, whereby the addresses of a subsequent cycle outputted at the successive accessing by the multidimensional address generating means do not indicate addresses in an area which can not be corrected by the address correction means.

According to claim 6 of the present invention, there is provided an address generating apparatus as defined claim 5, the addressing domain setting means is configured such that the addressing domain sets the final address and the total data number, and the top address is automatically generated by subtracting the total data number from the final address.

Therefore, in addition to that the address generation realized by the address generating apparatus of claim 5, a correction calculation in the address correction means is simplified, and the circuit scale is reduced.

According to claim 7 of the invention, there is provided an address generating apparatus as defined in claim 5, wherein the multidimensional address generating means generates a start address of the multidimensional area which is updated by the address output at a start cycle of addressing.

Therefore, in addition to that the address generation is realized as by the address generating apparatus of claim 5 in a case where the start address of a multidimensional area to be accessed is already outside the addressing domain, and thus an actual memory access is preformed with an address obtained by correcting the start address, the start address setting means is automatically set again to the corrected address employed for the actual access, whereby the amount of arithmetic operations required for address calculations by a program when a new addressing is performed based on the start address is reduced.

According to claim 8 of the invention, there is provided an address generating apparatus as defined in claim 1 or 2, wherein the multidimensional address generating means which can successively generate addresses in a multidimensional area comprises a data number setting means for setting a start address in a multidimensional area, incremental values in respective scanning directions, and data numbers in respective scanning directions and an independent cumulative register for accumulating addresses in respective scanning directions, and calculates an address value of a subsequent cycle by adding the incremental value corresponding to the scanning direction to the cumulative register corresponding to the scanning direction an address calculation when the scanning direction is changed, to output the same, and among the cumulative registers for accumulating the addresses in respective scanning directions, a cumulative register in the lowest order scanning direction stores the address value of a subsequent cycle while other cumulative register stores one selected from the corrected addresses outputted by the address correction means and the address value of a subsequent cycle, and one selected from the output of the cumulative register storing an address in the lowest scanning direction and the address outputted by an address pointer of the address correcting means is taken out as an output address.

With such configuration, in addition to that the address generation is realized by the address generating apparatus of claim 1 or 2, a regular address generation by the multidimensional address generating means and an address generation in which a multidimensional address is generated without running over the addressing domain can be realized in a same circuit by switching a mode switching signal:

According to claim 9 of the invention, there is provided an address generating apparatus as defined in claim 8, wherein the addressing domain setting means is configured such that the addressing domain sets the final address and the total data number, and the top address is automatically generated by subtracting the total data number from the final address.

Therefore, in addition to that the address generation is realized as by the address generating apparatus of claim 8, a correction calculation in the address correcting means is simplified, and the circuit scale is reduced.

According to claim 10 of the present invention, there is provided an address generating apparatus as defined in claim 8, wherein the start address of the multidimensional area is updated by the address output at a start cycle of addressing.

Therefore, in addition to that the address generation is realized by the address generating apparatus of claim 8, in a case where the start address of a multidimensional area to be accessed is already outside the addressing domain, and thus an actual memory access is preformed with an address that is obtained by correcting the start address, the start address setting means is automatically set again to the corrected address employed for the actual access, whereby the amount of arithmetic operations required for address calculations by a program when a new addressing is performed based on the start address is reduced.

According to claim 11 of the present invention, there is provided a motion vector detector which comprises: a memory outside a processor for storing image data; an internal memory inside a processor for storing image data used for arithmetic operations for the motion vector detection only, employing direct memory access transfer from the memory outside the processor; an arithmetic means for performing arithmetic operations for the motion vector detection; and an address generating apparatus as defined in any of claims 1 to 10 which generates an address for to accessing a rectangular area of the internal memory.

With such configuration, with respect to image data required for motion vector detection, there is no necessity for arranging all the data in a range where search is to be performed in the internal memory, and it is possible to take only the pixels that are required as searching processing goes on into the internal memory. This is effective for the motion vector detection processing in a small sized terminal having only limited memory capacity, and provides effects on the DMA transfer of the minimum required amount and the suppression of address calculation of a memory.

BRIEF DESCRIPTION OF DRAWINGS

FIG. 2 is a diagram showing an example of a pattern of addresses generated by the address generating apparatus according to the first embodiment of the invention, where FIG. 2(a) is a diagram explaining an access when addresses run over in a longitudinal direction, while FIG. 2(b) is a diagram explaining an access when addresses run over in a lateral direction.

FIG. 4(a) is a diagram showing a setting pattern of the addressing domain when a final address has a larger value than that of a top address, while FIG. 4(b) is a diagram showing a setting pattern of the addressing domain when the final address has a smaller value than that of the top address.

FIG. 23 is a diagram illustrating the operation when the conventional address generating apparatus actually accesses image data, where FIG. 23($a$) is a diagram showing a case where an access is performed in a lateral direction, while FIG. 23($b$) is a diagram showing a case where an access is performed in a longitudinal direction.

FIG. 24 is a diagram illustrating a relationship between a selection signal and an address to be an input of an address pointer 215 according to the second embodiment of the present invention.

BEST MODE TO EXECUTE THE INVENTION

Hereinafter, embodiments of the present invention will be described with reference to FIGS. 1 to 17.
(Embodiment 1)

This first embodiment corrects addresses, when an addressing domain is to run over an area set by a user, so that the addressing domain is within the area set by the user, thereby to generate an address.

Figure 1:
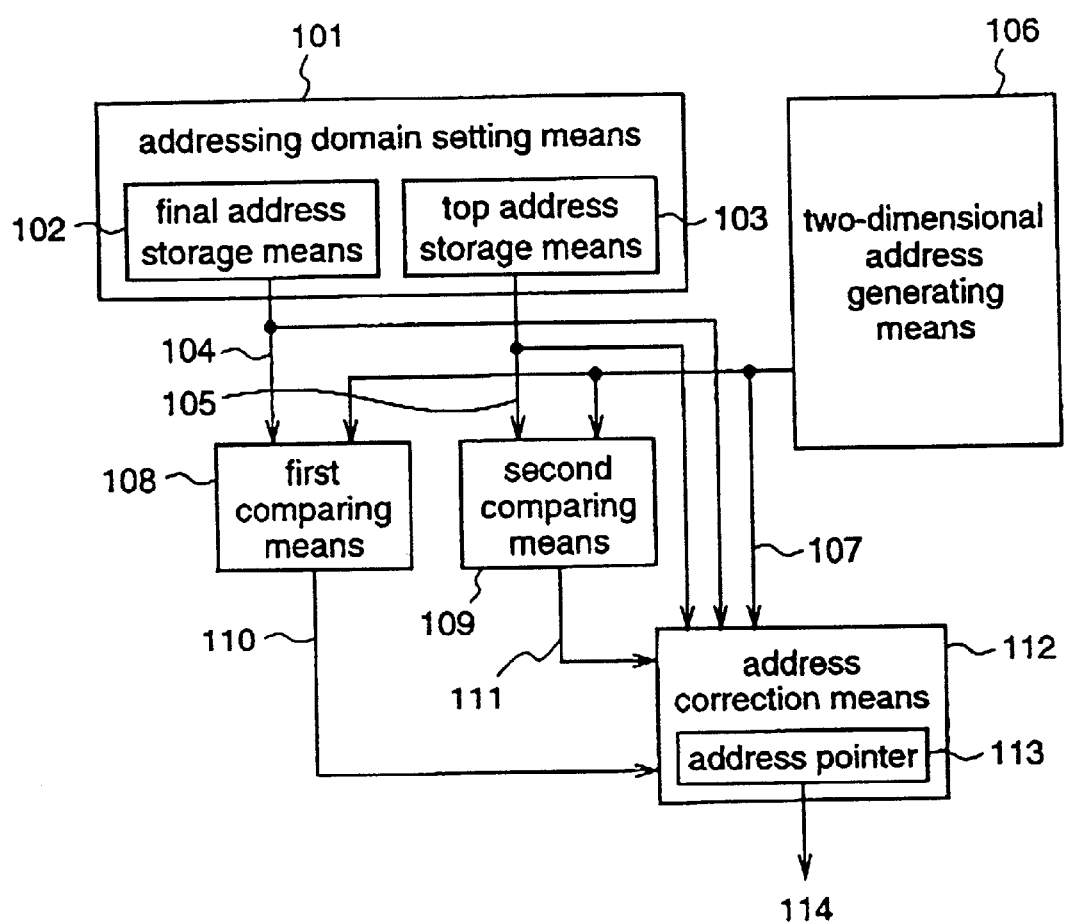
FIG. 1 is a diagram illustrating the configuration of an address generating apparatus according to a first embodiment of the present invention.

FIG. 1 illustrates an address generating apparatus according to the first embodiment of the present invention and corresponds to the invention according to claim 1 of the present application. In FIG. 1, numeral 101 denotes an addressing domain setting means for setting an addressing domain (such as an area to be mapped in a data memory within a processor) in a memory (such as an external memory), numeral 102 denotes a final address storage means for storing a final address to set the addressing domain, numeral 103 denotes a top address storage means for storing a top address to set the addressing domain, and by changing their setting values, the domain definition can be varied, thereby enabling a scroll of the addressing domain in the memory. Further, numeral 104 denotes a final address as an output of the final address storage means 102, numeral 105 denotes a top address as an output of the top address storage means 103, numeral 106 denotes a two-dimensional address generating means which can generate addresses in an arbitrary two-dimensional rectangular area by generating addresses every cycle, numeral 107 denotes an address of a subsequent cycle as each address comprising a two-dimensional rectangular area, which is outputted every cycle by the two-dimensional address generating means 106, numeral 108 denotes a first comparing means which performs comparison between the final address 104 and the address 107 of a subsequent cycle which are input, numeral 109 denotes a second comparing means which performs comparison between the top address 105 and the address 107 of a subsequent cycle which are input, numeral 110 denotes a first comparison result as an output of the first comparing means 108, numeral 111 denotes a second comparison result as an output of the second comparing means 109, numeral 112 denotes an address correction means which performs arithmetic operations for address correction, receiving the final address 104, the top address 105, the address 107 of a subsequent cycle, the first comparison result 110, and the second comparison result 111 as inputs, numeral 113 denotes an address pointer which stores an address value after correction, and numeral 114 denotes an output address as an output of the address pointer 113.

Next, the operation will be described. The addressing domain setting means 101 comprises the final address storage means 102 and the top address storage means 103 for storing a final address and a top address of the addressing domain set by a user, respectively, and these output the final address 104 and the top address 105, respectively. Meanwhile, the two-dimensional address generating means 106 performs address calculations for accessing a two-dimensional area and outputs the address 107 of a subsequent cycle. The first comparing means 108 performs comparison with the final address 104 and the address 107 of a subsequent cycle as inputs, and outputs the first comparison result 110 as ON when the value of the address 107 of a subsequent cycle is larger than that of the final address 104, while outputs the comparison result as OFF when the value is smaller or equal. Similarly, the second comparing means 109 performs comparison with the top address 105 and the address 107 of a subsequent cycle as inputs, and outputs the second comparison result 111 as ON when the value of the address 107 of a subsequent cycle is smaller than that of the top address 105, while outputs the comparison result as OFF when the value is larger or equal. The address correction means 112 has the final address 104, the top address 105, and the address 107 of a subsequent cycle as inputs, calculates a correction address a and a correction address b by correction address $a$=address 107 of a subsequent cycle−(final address 104−top address 105+1)     (formula 1-1)

correction address $b$=address 107 of a subsequent cycle+(final address 104−top address 105+1)     (formula 1-2), selects one of the correction address a, the correction address b, and the address 107 of a subsequent cycle with two inputs of the first comparison result 110 and the second comparison result 111 as selection signals, and stores it in the address pointer 113, and then, an output of the address pointer 113 becomes the output address 114 outputted by the address generating apparatus according to the first embodiment.

A selection method of the address correction means 112 is such that the correction address a is selected when the first comparison result 110 is ON, the correction address b is selected when the second comparison result 111 is ON, and the address 107 of a subsequent cycle is selected when both of the first comparison result 110 and the second comparison result 111 are OFF.

With such configuration, initially, settings of the final address and the top address which determine the addressing domain are performed to the final address setting means 102 and the top address setting means 103, and a setting according to an area to be accessed is performed to the two-dimensional address generating means 106 by a user. When addressing is started, it is detected whether the address 107 of a subsequent cycle calculated by the two-dimensional address generating means 106 run overs the addressing domain or not by the first comparing means 108 and the second comparing means 109, and when it does not run over, the address 107 of a subsequent cycle is stored in the address pointer 113 inside the address correction means 112, while the correction address a or the correction address b is stored therein when the address 107 run overs, and then, an output of the address pointer 113 becomes the output address 114.

Figures 2A, 2B:
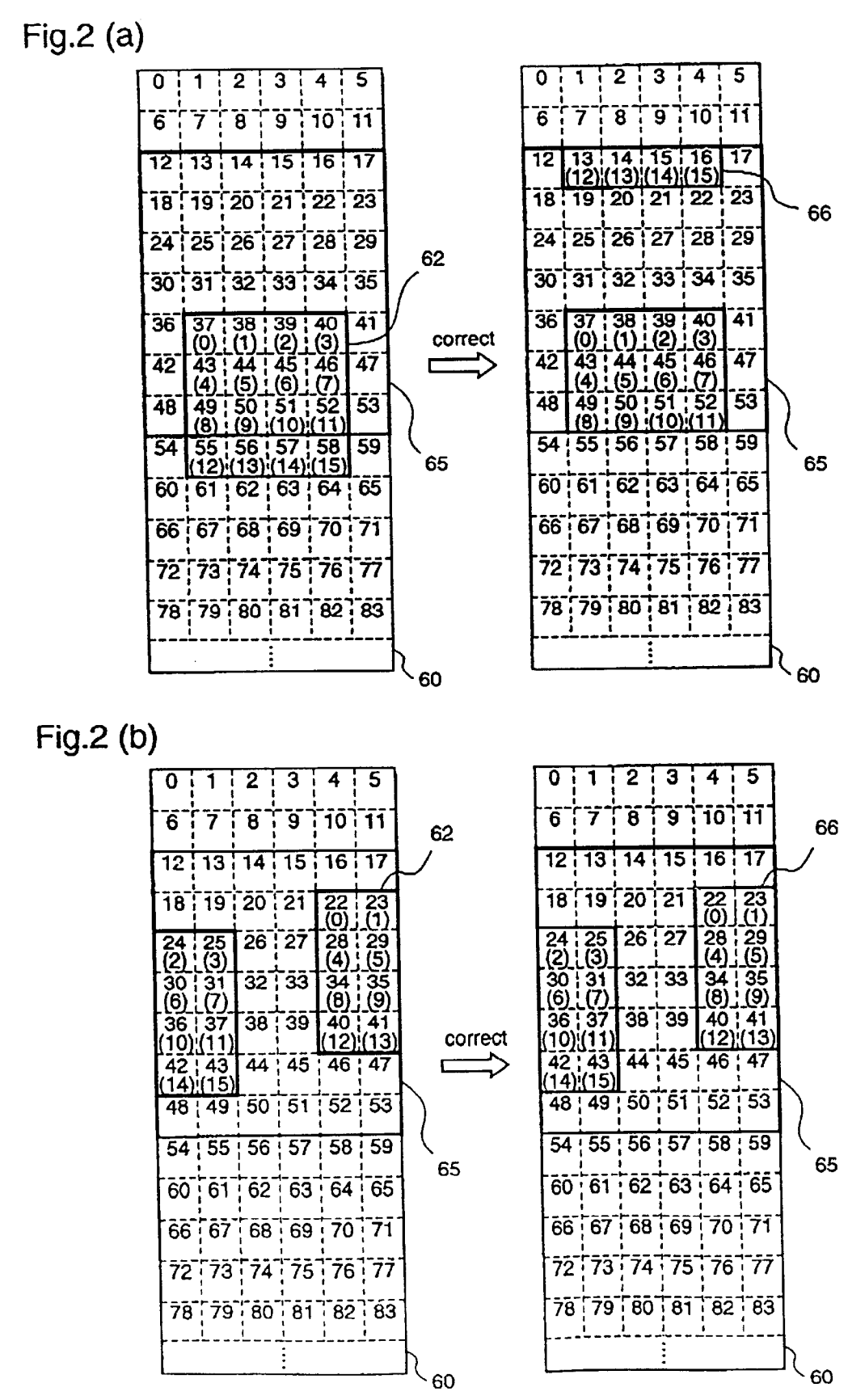

An example of a state where actual image data are accessed will be described in FIG. 2. FIG. 2(*a*) is a diagram explaining an access when addresses run over in a longitudinal direction, while FIG. 2(*b*) is a diagram explaining an access when addresses run over in a lateral direction.

First, the operation when addresses generated by the two-dimensional address generating means run over the addressing domain in a longitudinal direction will be described with reference to FIG. 2(*a*). Numeral 60 denotes a data memory which stores image data, numeral 62 denotes an objective rectangular area to be accessed of 4×4 pixels generated by the two-dimensional address generating means 106, numeral 65 denotes an addressing domain of 6×7 pixels which is set scrollably in the data memory 60 by the addressing domain setting means 101, and numeral 66 denotes an objective rectangular area to be accessed after address correction which is corrected by the address correction means 112. Numbers 0 to 83, . . . described within the frame of the data memory 60 are actual addresses of the memory, and (0) to (15) represent an order in which the two-dimensional address generating means 106 accesses the objective rectangular area 62 to be accessed of 4×4 pixels out of addresses of the data memory 60.

53 is stored in the final address storage means 102 and 12 is stored in the top address storage means 103 of the addressing domain setting means 101.

At this time, the two-dimensional address generating means 106 outputs 37, 38, 39, 40, 43, 44, 45, 46, 49, 50, 51, 52, 55, 56, 57, and 58 sequentially as the addresses 107 of a subsequent cycle at a first cycle to a 16th cycle.

When the address 107 of a subsequent cycle of the two-dimensional address generating means 106 is within the range of the addressing domain 65 composed of a rectangular area of 6×7 pixels, that is, when the address 107 of a subsequent cycle of the two-dimensional address generating means 106 is 37, 38, 39, 40, 43, 44, 45, 46, 49, 50, 51, or 52, the output 110 of the first comparing means 108 is OFF and the output 111 of the second comparing means 109 is OFF too, whereby the address correction means 112 dose not perform address correction and outputs the address 107 of a subsequent cycle outputted by the two-dimensional address generating means 106, that is, 37, 38, 39, 40, 43, 44, 45, 46, 49, 50, 51, or 52, as it is.

When the address 107 of a subsequent cycles of the two-dimensional address generating means 106 run overs the range of the addressing domain 65 composed of a rectangular area of 6×7 pixels, that is, when the address 107 of a subsequent cycle of the two-dimensional address generating means is 55, 56, 57, or 58, the output 110 of the first comparing means 108 is ON and the output 111 of the second comparing means 109 is OFF, whereby the address correction means 112 outputs the correction address a according to the (formula 1-1).

That is, it is expressed by $$\text{correction address } a = \text{address } \mathbf{107} \text{ of a subsequent cycle} - (\text{final address } \mathbf{104} - \text{top address } \mathbf{105} + 1) = \text{address } \mathbf{107} \text{ of a subsequent cycle} - (41 - 0 + 1) = \text{address } \mathbf{107} \text{ of a subsequent cycle} - 42,$$

and these addresses 107 of a subsequent cycle are corrected into 13, 14, 15, and 16, whereby what would run over the range of the addressing domain 65 composed of a rectangular area of 6×7 pixels if the address correction means 112 did not exist are within the rectangular area of 6×7 pixels.

While a description was given of a case where the two-dimensional address generating means 106 generates addresses in a lateral direction, also in a case where addresses are generated in a longitudinal direction and run over in a longitudinal direction, they are within a rectangular area of 6×7 pixels by the same operation.

Next, the operation when addresses generated by the two-dimensional address generating means run over the addressing domain in a lateral direction will be described with reference to FIG. 2(*b*). Numeral 60 denotes a data memory which stores image data, numeral 62 denotes an objective rectangular area to be accessed of 4×4 pixels generated by the two-dimensional address generating means 106, numeral 65 denotes an addressing domain of 6×7 pixels set by the addressing domain setting means 101, and numeral 66 denotes an objective rectangular area to be accessed after address correction, which is corrected by the address correction means 112. Numbers 0 to 83, . . . described within the frame of the data memory 60 are actual addresses of the memory, and (0) to (15) represent an order in which the two-dimensional address generating means 106 accesses the objective rectangular area 62 to be accessed of 4×4 pixels out of addresses of the data memory 60.

53 is stored in the final address storage means 102 and 12 is stored in the top address storage means 103 of the addressing domain setting means 101.

At this time, the two-dimensional address generating means 106 outputs 22, 23, 24, 25, 28, 29, 30, 31, 34, 35, 36, 37, 40, 41, 42, and 43 sequentially as the addresses 107 of a subsequent cycle at a first cycle to a 16th cycle.

In this case, the addresses 107 of a subsequent cycle of the two-dimensional address generating means 106 are all within the range of the addressing domain 65 composed of a rectangular area of 6×7 pixels, and thus the output of the fist comparing means 108 is OFF and the output of the second comparing means 109 is OFF too, whereby the address correction means 112 does not perform address correction and outputs the address 107 of a subsequent cycle outputted by the two-dimensional address generating means 106, that is, 22, 23, 24, 25, 28, 29, 30, 31, 34, 35, 36, 37, 40, 41, 42, or 43, as it is.

While a description was given of a case where the two-dimensional address generating means 106 generates addresses in a lateral direction, also in a case where addresses are generated in a longitudinal direction and run over in a lateral direction, they are within a rectangular area of 6×7 pixels by the same operation.

As described above, according to the first embodiment, when the addresses generated by the two-dimensional address generating means 106 run over an area set in the addressing domain setting means 101 by a user, a correction calculation of the addresses is automatically performed by the address correction means 112 so that an access is performed to a space in which the addressing domain is supposed to be a spiral annular space having an address subsequent to the final address as the top address of the addressing domain, i.e., to a space in which in the column direction, when, for example, the addressing domain goes beyond the bottom row of the whole rectangular area and accesses are to be performed to further downward rows, addresses are corrected so that the addressing domain returns to the top row of the whole rectangular area and accesses are performed to sequentially downward rows therefrom, thereby the addresses succeed spirally in the column direction, and in the row direction, when accesses are to be performed to the end of a row in the addressing domain, addresses are corrected so that accesses are next performed from the beginning of the subsequent row, whereby the output address can be made always remain in the addressing domain set by a user.

Therefore, it is possible to provide an address generating apparatus can be provided which can automatically generate an address in the multidimensional area which does not run over a restricted area of the data memory set by a user, and which can solve the contradictory problem that the DMA transfer number increases when the data memory area used is suppressed, while the data memory area increases when the DMA transfer number is suppressed, which has been a problem in a conventional multidimensional address generating means, because it is only required to perform DMA transfer for data of addresses which are to run over an area set by a user, when the addressing domain is to run over the area set by a user. Further, since the addressing domain is originally a continuous area, and it is neither necessary to perform a judgement whether it runs over an area set by a user or not, nor necessary to perform an address correction, it does not result an increase in the circuit size or an increase in the processes by CPU. Also, since the judgment of the running over and the address correction operation is performed for each address, it can cope with a multidimensional access, an interleave access, or an access from backward addresses by the same circuit, and the initially existing position and shape of the area which is to run over are not restricted to particular ones, whereby an increase in the data memory area can be suppressed.

However, the range of addresses which can be corrected by the address correction means is restricted to one in which the address value of a subsequent cycle outputted by the multidimensional address generating means is, when it deviates to a lower address side from the top address of the addressing domain, within a range to the address value that is obtained by subtracting the data number of the addressing domain from the top address, or to one in which that address value is, when it deviates to a higher address side from the final address of the addressing domain, within a range to the address value that is obtained by adding the data number of the addressing domain to the final address.

While in the above-mentioned description, a case where the two-dimensional address generating means 106 is employed as a means for outputting the address 107 of a subsequent cycle is shown, it is also possible to realize a configuration that employs an address generating means which performs one-dimensional successive address generation and an address generating means which corresponds to an increase in the data quantity in a multi-dimensional arbitrary direction.

(Embodiment 2)

This second embodiment corrects addresses, when an addressing domain is to run over an area set by a user, so that the addressing domain is within the area set by the user, thereby to generate an address, and copes with even such a case where the final address of the addressing domain does not have a value that is larger than that of a top address.

Figure 3:
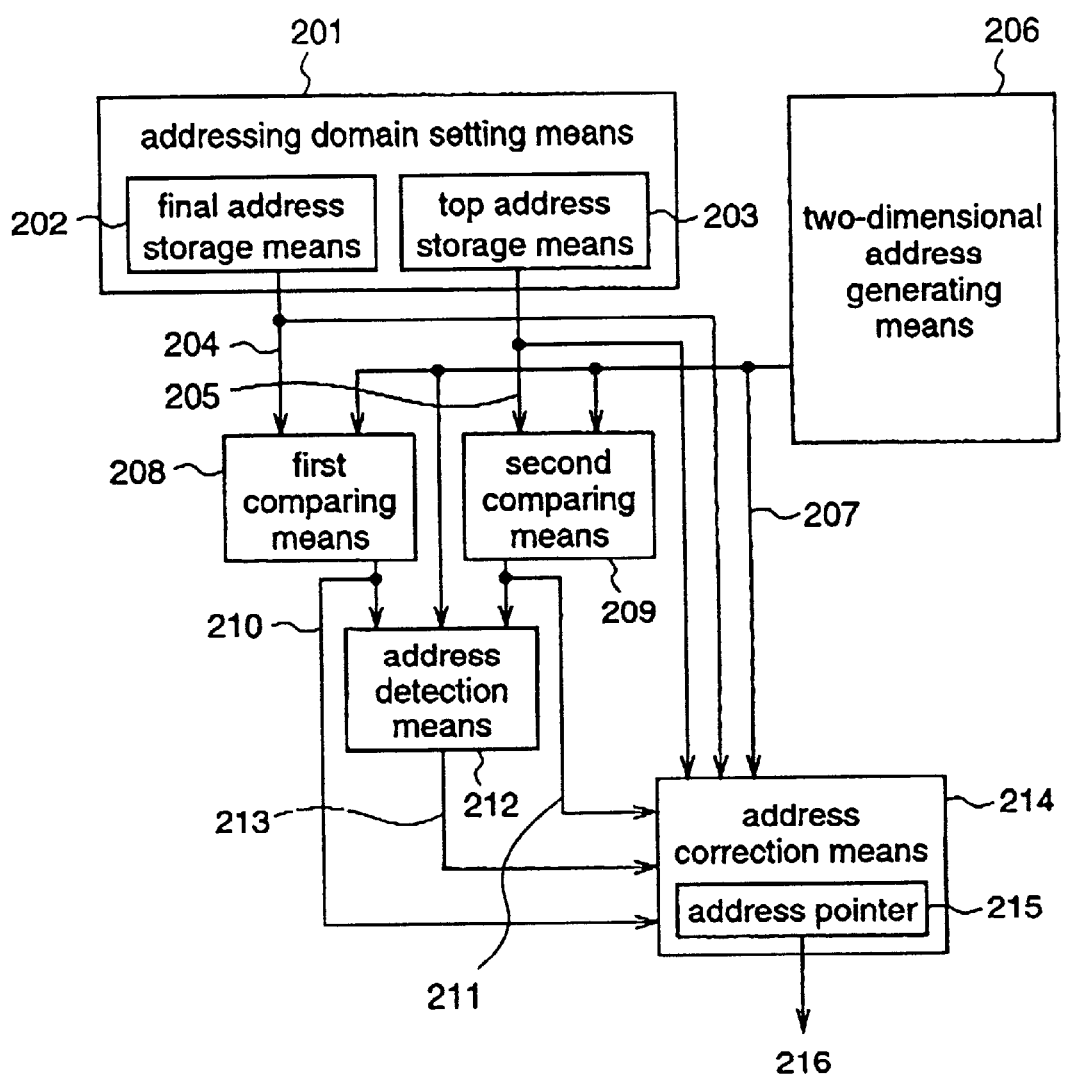
FIG. 3 is a diagram illustrating the configuration of an address generating apparatus according to a second embodiment of the present invention.

FIG. 3 illustrates an address generating apparatus according to the second embodiment of the present invention and corresponds to the invention according to claim 2 of the present application. In FIG. 3, numeral 201 denotes an addressing domain setting means, numeral 202 denotes a final address storage means for storing a final address to set an addressing domain (such as an area to be mapped in a data memory within a processor), numeral 203 denotes a top address storage means for storing a top address to set the addressing domain, and by changing their setting values, the domain definition is variable, thereby enabling a scroll of the addressing domain in a memory (such as an external memory). Further, numeral 204 denotes a final address as an output of the final address storage means 202, numeral 205 denotes a top address as an output of the top address storage means 203, numeral 206 denotes a two-dimensional address generating means which can generate an address in an arbitrary two-dimensional rectangular area, numeral 207 denotes an address of a subsequent cycle as an output of the two-dimensional address generating means 206, numeral 208 denotes a first comparing means which performs comparison according to size with the final address 204 and the address 207 of a subsequent cycle as inputs, numeral 209 denotes a second comparing means which performs comparison according to size with the top address 205 and the address 207 of a subsequent cycle as inputs, numeral 210 denotes a first comparison result as an output of the first comparing means 208, numeral 211 denotes a second comparison result as an output of the second comparing means 209, numeral 212 denotes an address detection means that detects which of the final address 204 and the top address 205 the address 207 of a subsequent cycle is nearer to, with the first comparison result 210, the second comparison result 211, and the address 207 of a subsequent cycle as inputs, to output a detection result 213 as an output, numeral 214 denotes an address correction means which performs arithmetic operations for address correction with the final address 204, the top address 205, the address 207 of a subsequent cycle, the first comparison result 210, the second comparison result 211, and the detection result 213 as inputs, numeral 215 denotes an address pointer which stores an address value after correction, and numeral 216 denotes an output address as an output of the address pointer 215.

Next, the operation will be described. The addressing domain setting means 201 comprises the final address storage means 202 for storing a final address (EA) and the top address storage means 203 for storing a top address (SA0) of the addressing domain set by a user, and these output the final address 204 and the top address 205, respectively. Meanwhile, the two-dimensional address generating means 206 performs address calculations for accessing a two-dimensional area and outputs the address 207 (A) of a subsequent cycle. The first comparing means 208 has the final address 204 (EA) and the address 207 (A) of a subsequent cycle as inputs, and outputs a value obtained by subtracting the address 207 (A) of a subsequent cycle from the final address 204 (FA) as the first comparison result 210 (Y).

$$Y=EA-A \quad \text{(formula 2-1)}$$

Similarly, the second comparing means 209 has the top address 205 (SA0) and the address 207 (A) of a subsequent cycle as inputs, and outputs a value obtained by subtracting the top address 205 (SA0) from the address 207 (A) of a subsequent cycle as the second comparison result 211 (X).

$$X=A-SA0 \quad \text{(formula 2-2)}$$

The address detection means 212 has the final address 204 (EA), the top address 205 (SA0), the first comparison result 210 (Y), the second comparison result 211 (X), and the address 207 (A) of a subsequent cycle as inputs, and detects the following two kinds of states to output the detection result 213. First, a sign hit of a calculation result (S) of $$S=EA-SA0 \quad \text{(formula 2-3)}$$

is detected, and according to its plus or minus, a positional relationship between the final address 204 (EA) and the top address 205 (SA0) in the memory is specified.

Figure 4:
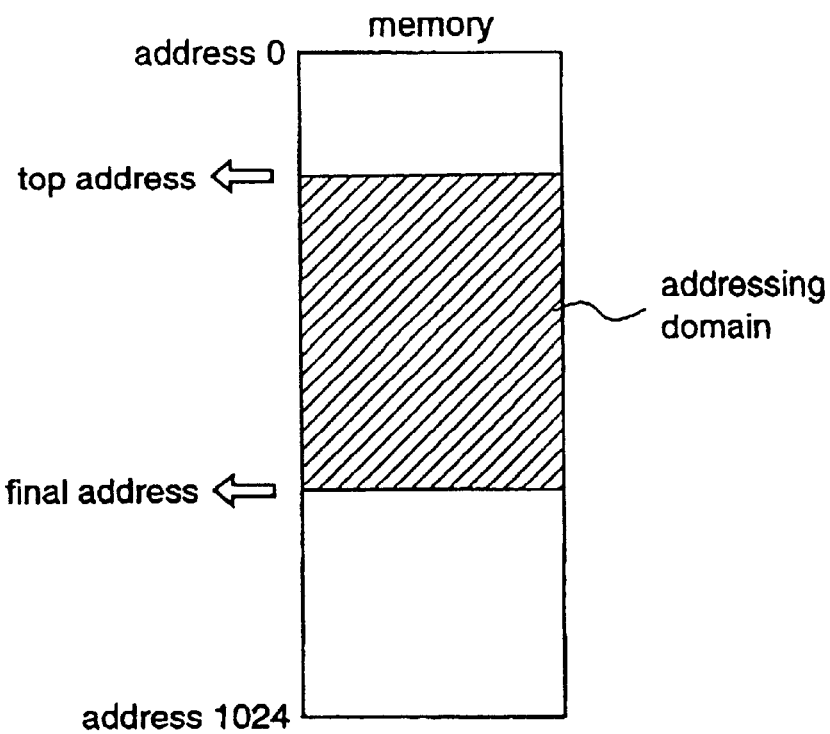
FIG. 4 is a conceptual diagram illustrating a setting pattern of an addressing domain according to the second embodiment of the invention, where
Figure 4:
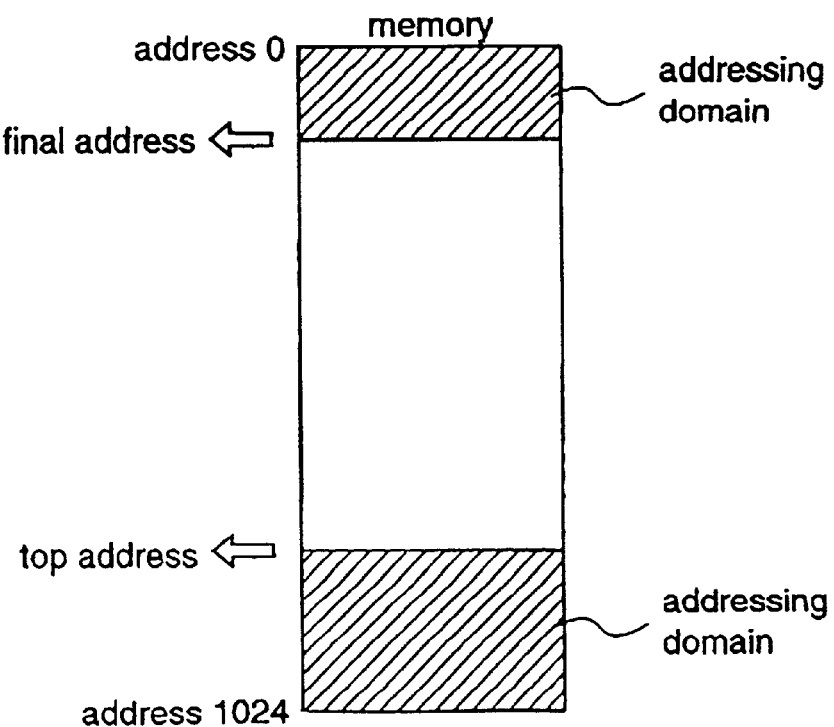

That is, when the calculation result (S) of the (formula 2-3) is plus, the final address 204 (EA) has a larger address value than an address value of the top address 205 (SA0) as shown in FIG. 4(*a*), and on the contrary, when the calculation result (S) of the (formula 2-3) is minus, a large-small relationship between the final address 204 (EA) and the top address 205 (SA0) is reversed as shown in FIG. 4(*b*), and in this case the addressing domain reaches from the top address 205 (SA0) to the last address of a target memory as well as from an address 0 of the target memory to the final address 204 (EA).

Next, it is detected whether the address 207 (A) of a subsequent cycle, when protruding the addressing domain, run over beyond the top address 205 (SA0), or beyond the final address 204 (EA), according to the calculation result (S) of the (formula 2-3). In this regard, beyond which it run over is judged by which of the top address 205 (SA0) and the final address 204 (EA), the position of the address 207 (A) of a subsequent cycle in the memory area is nearer to.

The address correction means 214 has the final address 204, the top address 205, the address 207 of a subsequent cycle, and the detection result 213 of the address detection means 212 as inputs, and calculates a correction address a and a correction address b by correction address *a*=address 207 of a subsequent cycle−(final address 204−top address 205+1)   (formula 2-4)

correction address *b*=address 207 of a subsequent cycle+(final address 204−top address 205+1)   (formula 2-5)

when the sign bit of the arithmetic operation result of the formula 2-3 is "0", that is, when the arithmetic operation result is plus, while calculates a correction address a' and a correction address b' by correction address *a'*=address 207 of a subsequent cycle−(top address 205−final address 204−1)   (formula 2-6)

correction address *b'*=address 207 of a subsequent cycle+(top address 205−final address 204−1)   (formula 2-7)

when the sign bit is "1", that is, when the arithmetic operation result is minus. "~" indicates the that value of bit is inverted for each bit weight. One of the correction address a, the correction address b, the correction address a', the correction address b', and the address 207 of a subsequent cycle is selected with two inputs of the first comparison result 210 and the second comparison result 211 as well as the detection result 213 as selection signals, to be stored in the address pointer 215, and an output of the address pointer 215 becomes the output address 216 outputted by the address generating apparatus according to this second embodiment.

The relationship between the selection signals and an address to be an input of the address pointer 215 is described in FIG. 24.

With such configuration, initially, settings of the final address and the top address which determine the addressing domain are performed to the final address setting means 202 and the top address setting means 203, and a setting according to an area to be accessed is performed to the two-dimensional address generating means 206 by a user. When addressing is started, it is detected whether the address 207 of a subsequent cycle calculated by the two-dimensional address generating means 206 run over the addressing domain or not by the first comparing means 208 and the second comparing means 209, and further, it is also detected by the address detection device 212 how is the positional relationship between the top address 205 and the final address 204 of the addressing domain in the memory, as well as to which of the address positions of the final address 204 and the top address 205, the address position of the address 207 of a subsequent cycle is nearer to. According to this information, four correction addresses, the correction address a, the correction address b, the correction address a', and the correction address b' are calculated, and one of the five addresses, the address 207 of a subsequent cycle being added to the above four addresses, is selected and stored in the address pointer 215 inside the address correction means 214. An output of this address pointer 215 becomes the output address 216.

As described above, according to the second embodiment, in addition to the effect corresponding to the first embodiment is obtained, that when the addresses generated by the two-dimensional address generating means 206 should run over an area in the addressing domain setting means 201 set by a user, a correction calculation of the addresses is automatically performed by the address correcting means 214, supposing the addressing domain to be a spiral annular space with an address subsequent to the final address as the top address of the addressing domain, thereby the output address can be made always remain in the addressing domain set by a user, it is possible to provide an address generating apparatus which can automatically generate an address of a multidimensional area by employing the address detection means 212, even when the positional relationship between the top address 205 and the final address 204 in the memory is inverted, that is, when a setting in which the addressing domain strides the last address of the target memory is performed, which can detect the address 207 of a subsequent cycle that runs over the addressing domain to correct the same to be in the domain, which can solve the contradictory problem that the DMA transfer number increases when the data memory area used is suppressed, while the data memory area increases when the DMA transfer number is suppressed, as a problem in a conventional multidimensional address generating means. Further, since it is silly required to perform DMA transfer for data of addresses which are to run over an area set by a user, without running over a restricted area in the data memory set by a user, the address generating apparatus can suppress an increase in the data memory area without increasing the circuit size and the processes by CPU. Further, the initially existing position and shape of the area which are to run over are not restricted to particular ones.

While in the above-mentioned description, a case where the two-dimensional address generating means 206 is employed as a means for outputting the address 207 of a subsequent cycle is shown, it is also possible to realize a configuration that employs an address generating means which performs one-dimensional successive address generation and an address generating means which corresponds to an increase of the data quantity in a multi-dimensional arbitrary direction.

(Embodiment 3)

This third embodiment specifies a final address and a total data number of an addressing domain, in place of specifying the final address and the top address, at the setting of the addressing domain, thereby to set the addressing domain.

Figure 5:
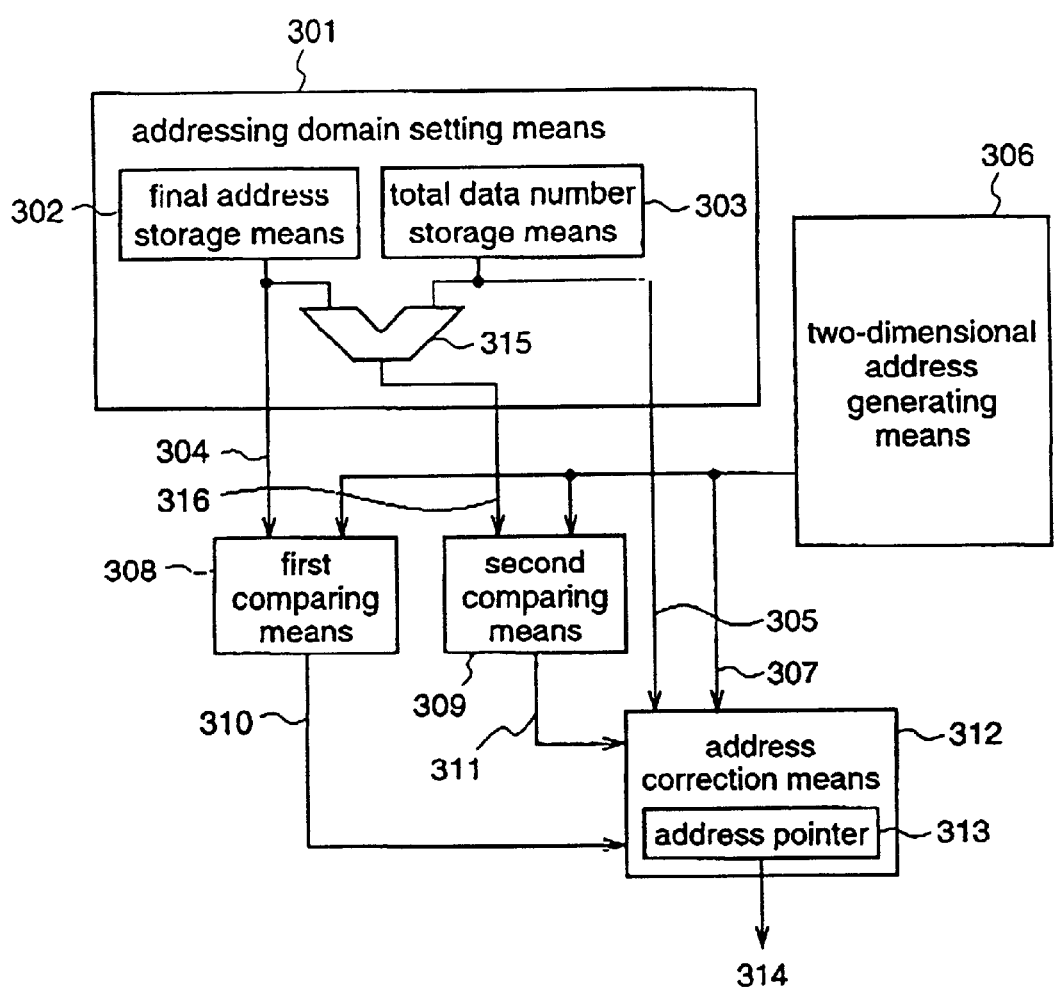
FIG. 5 is a diagram illustrating the configuration of an address generating apparatus according to a third embodiment of the present invention.

FIG. 5 illustrates an address generating apparatus according to the third embodiment of the present invention and corresponds to the invention according to claim 3 of the present application. In FIG. 5, numeral 301 denotes an addressing domain setting means, numeral 302 denotes a final address storage means for storing a final address to set an addressing domain, numeral 303 denotes a total data number storage means for storing a total data number constituting the addressing domain, and by changing their setting values, the domain definition is variable, thereby enabling a scroll of the addressing domain (such as an area to be mapped in a data memory within a processor) in the memory (such as an external memory). Further, numeral 304 denotes a final address as an output of the final address storage means 302, numeral 305 denotes a total data number as an output of the total data number storage means 303, numeral 306 denotes a two-dimensional address generating means which can generate an address in an arbitrary two-dimensional rectangular area, numeral 307 denotes an address of a subsequent cycle as an output of the two-dimensional address generating means 306, numeral 308 denotes a first comparing means which performs comparison according to size with the final address 304 and the address 307 of a subsequent cycle as inputs, numeral 309 denotes a second comparing means which performs comparison according to size with a top address 316 and the address 307 of a subsequent cycle as inputs, numeral 310 denotes a first comparison result as an output of the first comparing means 308, numeral 311 denotes a second comparison result as an output of the second comparing means 309, numeral 312 denotes an address correction means which performs arithmetic operations for address correction with the final address 304, the total data number 305, the address 307 of a subsequent cycle, the first comparison result 310, and the second comparison result 311 as inputs, numeral 313 denotes an address pointer which stores an address value after correction, numeral 314 denotes an output address as an output of the address pointer 313, numeral 315 denotes a subtracter which subtracts the total data number 305 from the final address 304, and numeral 316 denotes a top address obtained by subtracting the total data number 305 from the final address 304.

Next, the operation will be described. The addressing domain setting means 301 comprises the final address storage mans 302 for storing a final address of the addressing domain set by a user, the total data number storage means 303 for storing the total data number of the addressing domain, and the subtracter for subtracting the total data number 305 from the final address 304, and these output the final address 304, the total data number 305, and the top address 316 obtained by subtracting the total data number 305 from the final address 304, respectively. Meanwhile, the two-dimensional address generating means 306 performs address calculations for accessing a two-dimensional area and outputs the address 307 of a subsequent cycle. The first comparing means 308 has the final address 304 and the address 307 of a subsequent cycle as inputs, and outputs the first comparison result 310 as ON when the value of the address 307 of a subsequent cycle is larger than that of the final address 304, while outputs the comparison result as OFF when the value is smaller or equal. Similarly, the second comparing means 309 has the top address 316 and the address 307 of the subsequent cycle as inputs, and outputs the second comparison result 311 as ON when the value of the address 307 of a subsequent cycle is smaller than that of the top address 316, while outputs the comparison result as OFF when the value is larger or equal. The address correction means 312 has the total data number 305 and the address 307 of a subsequent cycle as inputs, calculates a correction address a and a correction address b by correction address $a$=address 307 of a subsequent cycle−total data number  (formula 3-1)

correction address $b$=address 307 of a subsequent cycle+total data number  (formula 3-2), selects one of the correction address a, the correction address b, and the address 307 of a subsequent cycle with two inputs of the first comparison result 310 and the second comparison result 311 as selection signals, and stores it in the address pointer 313, and then, an output of the address pointer 313 becomes the output address 314 outputted by the address generating apparatus according to the third embodiment.

A selection method of the address correction means 312 is such that the correction address a is selected when the first comparison result 310 is ON, the correction address b is selected when the second comparison result 311 is ON, and the address 307 of a subsequent cycle is selected when both of the first comparison result 310 and the second comparison result 311 are OFF.

In this third embodiment, while it is different from the first and second embodiments that a method of setting the addressing domain is changed from one that comprises setting the final address and the top address to one that comprises setting the final address and the total data number, and that the top address is calculated automatically by the subtracter provided, other configurations are the same as those in the first embodiment and their operations will be described briefly here.

That is, the total data number 305 as an output of the total data number storage means 303 which stores the total data number of the addressing domain is inputted to the subtracter 315 and is subjected to a subtraction with the final address 304 so that the top address 316 is calculated, as well as is inputted to the address correction means 312 so that calculations for the correction addresses are performed as described in the formulas 3-1 and 3-2.

As described above, according to the third embodiment, in addition to the effect corresponding to the first embodiment is obtained, that when the addresses generated by the two-dimensional address generating means 306 should run over an area set in the addressing domain setting means 301 by a user, a correction calculation of the addresses is automatically performed by the address correcting means 312, supposing the addressing domain to be a spiral annular space with an address subsequent to the final address as the top address of the addressing domain, thereby the output address can be made always remain in the addressing domain set by a user, as well as the contradictory problem that the DMA transfer number increases when the data memory area used is suppressed while the data memory area increases when the DMA transfer number is suppressed can be solved, and an increase in the data memory area can be suppressed without increasing the circuit size and the processes by CPU. Further, the initially existing position and shape of an area which are to run over are not restricted to particular ones, the addressing domain set by a user is set by the final address and the total data number, thereby the address correction calculation performed by the address correction means 312 can be simplified, resulting in reduction in the hardware scale.

Also with respect to the second embodiment, in which a method of setting the addressing domain comprises setting the final address and the top address, it is possible to make a change so that the final address and the total data number are set, as in this third embodiment.

Figure 6:
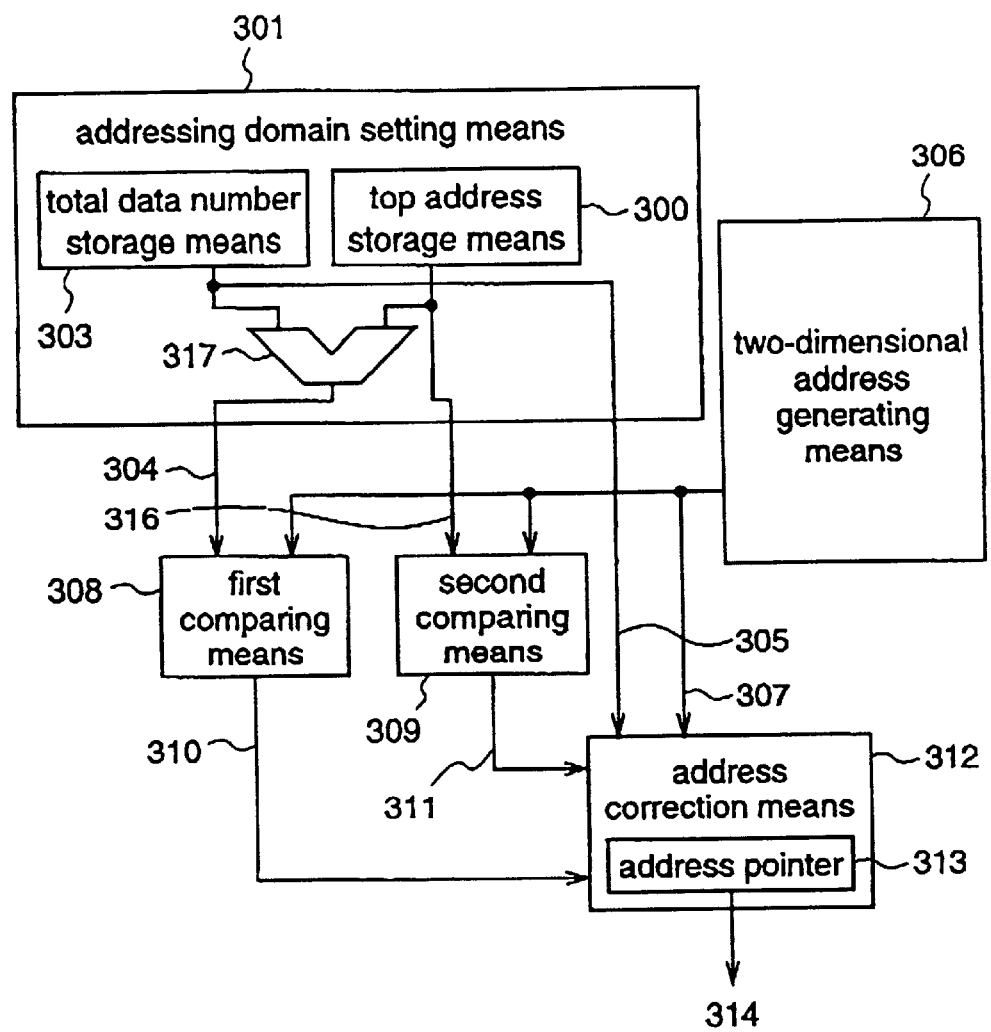
FIG. 6 is a diagram illustrating the configuration of the address generating apparatus according to the third embodiment of the invention.

Further, it is also possible to set the top address and the total data number of the addressing domain, thereby to set the addressing domain as shown in FIG. 6.

In FIG. 6, numeral 301 denotes the addressing domain setting means, numeral 303 denotes the total data number storage means for storing the total data number constituting the addressing domain, numeral 300 denotes a top address storage means for storing the top address for setting the addressing domain, numeral 317 denotes an adder which adds the total data number 305 to the top address 316, and others are the same as those shown in FIG. 5.

In FIG. 6, while it is different from the first and second embodiments that a method of setting the addressing domain is changed from one that comprises setting the final address and the top address to one that comprises setting the top address and the total data number, and that the final address is calculated automatically by the adder provided, other configurations are the same as those in the first embodiment and their operations will be described briefly here.

That is, the total data number 305 as an output of the total data number storage means 303 which stores the total data number of the addressing domain is inputted to the adder 317 and is subjected, to an addition with the top address 316 as an output of the top address storage means 300 so that the final address 304 is calculated, as well as is inputted to the address correction means 312 so that calculations for the correction addresses are performed as described in the formulas 3-1 and 3-2.

As described above, according to the address generating apparatus in FIG. 6, the addressing domain that is set by a user by the top address and the total data number, whereby the address correction calculation performed by the address correction means 312 can be simplified, resulting in reduction in the hardware scale.

(Embodiment 4)

This fourth embodiment provides a construction which enables setting of the start address from which the address generation is to be started in the two-dimensional address generating means, thereby simplifying the subsequent address calculation.

Figure 7:
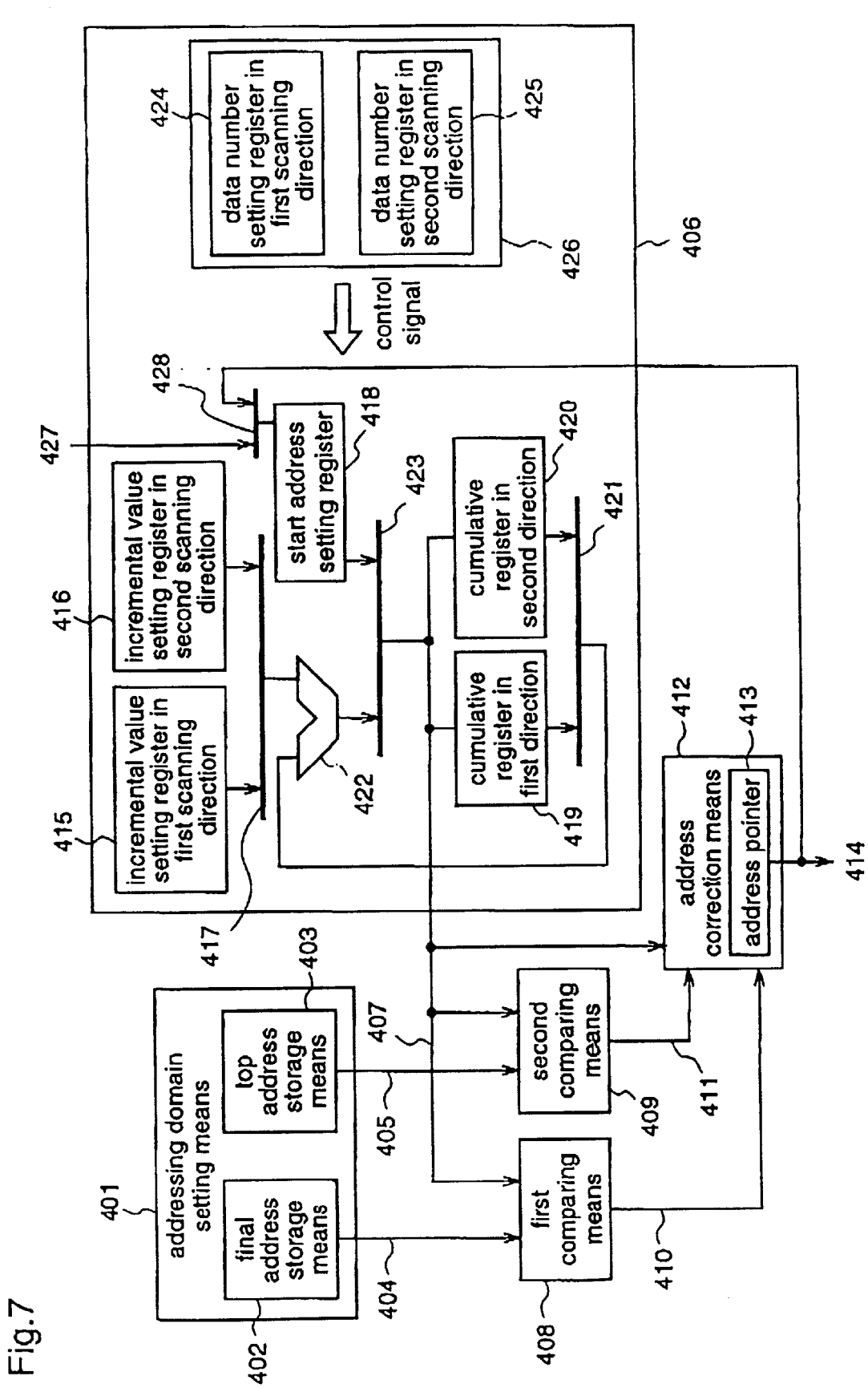
FIG. 7 is a diagram illustrating the configuration of an address generating apparatus according to a fourth embodiment of the present invention.

FIG. 7 illustrates an address generating apparatus according to the fourth embodiment of the present invention and corresponds to the invention according to claim 4 of the present application. In FIG. 7, numeral 401 denotes an addressing domain setting means, numeral 402 denotes a final address storage, means for storing a final address to set an addressing domain, numeral 403 denotes a top address storage means for storing a top address to set the addressing domain, and by changing their setting values, the domain definition is variable, thereby enabling a scroll of the addressing domain (such as an area to be mapped in a data memory within a processor) in a memory (such as an external memory). Further, numeral 404 denotes a final address as an output of the final address storage means 402, numeral 405 denotes a top address as an output of the top address storage means 403, numeral 406 denotes a two-dimensional address generating means which can generate an address in an arbitrary two-dimensional rectangular area, numeral 407 denotes an address of a subsequent cycle as an output of the two-dimensional address generating means 206, numeral 408 denotes a first comparing means which performs comparison according to size with the final address 404 and the address 407 of a subsequent cycle as inputs, numeral 409 denotes a second comparing means which performs comparison according to size with the top address 405 and the address 407 of a subsequent cycle as inputs, numeral 410 denotes a first comparison result as an output of the first comparing means 408, numeral 411 denotes a second comparison result as an output of the second comparing means 409, numeral 412 denotes an address correction means which performs arithmetic operations for address correction with the address 407 of a subsequent cycle, the first comparison result 410, and the second comparison result 411 as inputs, numeral 413 denotes an address pointer which stores an address value after correction, and numeral 414 denotes an output address as an output of the address pointer 413. Further, among constituent elements of the two-dimensional address generating means 406, numerals 415 and 416 denote incremental value setting registers in the first and the second scanning directions, respectively, numeral 417 denotes a first multiplexer which selects either of the outputs of the incremental value setting register 415 in the first scanning direction and the incremental value setting register 416 in the second scanning direction so as to output, numeral 418 denotes a start address setting register, numerals 419 and 420 denote a first and a second cumulative registers which correspond to the first and the second scanning directions, respectively, numeral 421 denotes a second multiplexer which selects either of the outputs of the first cumulative register 419 and the second cumulative register 420 so as to output, numeral 422 denotes an adder which adds the output of the second multiplexer 421 and the output of the first multiplexer 417, numeral 423 denotes a third multiplexer which selects either of the outputs of the adder 422 and the start address setting register 418 so as to output, numerals 424 and 425 denote data number setting registers in the first and the second scanning directions, respectively, numeral 426 denotes a control circuit which generates a control signal based on the set values of the data number setting register 424 in the first scanning direction and the data number setting register 425 in the second scanning direction, numeral 427 denotes a start address set by a user, and numeral 428 denotes a fourth multiplexer which selects either of the start address 427 and the output address 414 so as to output.

In this fourth embodiment, the two-dimensional address generating means 406 is the same as that in the first embodiment except that the output address 414 as an output of the address correction means 412 can be written into the start address setting register 418 for setting a start address through the fourth multiplexer 428 when a user sets a two-dimensional rectangular area to access, and others are also the same as those in the first embodiment, and their descriptions will be omitted here.

The fourth multiplexer 428 selects either the start address 427 set by a user or the output address 414, and the output thereof is inputted to the start address setting register 418. A selection signal of the fourth multiplexer 428 is controlled by the control circuit 426 such that the output address 414 is selected only at a first cycle where addressing is started.

As described above, according to the fourth embodiment, in addition to the effect according to the first embodiment is obtained, that when the addresses generated by the two-dimensional address generating means 406 should run over an area in the addressing domain setting means 401 set by a user, a correction calculation of the addresses is automatically performed by the address correcting means 412, supposing the addressing domain to be a spiral annular space with an address subsequent to the final address as the top address of the addressing domain, thereby the output address can be made always remain in the addressing domain set by a user, as well as that the contradictory problem that the DMA transfer number increases when the data memory area used is suppressed while the data memory area increases when the DMA transfer number is suppressed can be solved, and an increase in the data memory area can be suppressed without increasing the circuit size and the processes by CPU, and further the initially existing position and shape of an area to run over are not restricted, an effect is obtained that, because the fourth multiplexer 428 is provided which writes the output address 414 into the start address setting register 418 which sets a start address when a user sets a two-dimensional rectangular area to be accessed at the first cycle when the addressing is started, when the start address of a two-dimensional rectangular area to be accessed by a user run should run over the addressing domain, an address corrected by the address correcting means 412 is outputted as the output address 414 while the value of the start address 427 set by a user is overwritten by the output address 414 which has actually accessed the memory, thereby enabling performing subsequent accesses with the corrected address as the start address.

This can reduce the amount of arithmetic operation that is required for address calculation according to a program while performing new addressing based on the start address of the vector operation that is performed previously, in a case where vector operation is performed in a processor employing a memory as a source or a resource.

(Embodiment 5)

This fourth embodiment provides a construction which enables setting of the start address from which the address generation is to be started in the two-dimensional address generating means, thereby simplifying the subsequent address calculation.

This fifth embodiment provides a construction which enables setting of the start address from which the address generation is to be started in the two-dimensional address generating means, thereby simplifying the subsequent address calculation, as well as enables specifying the final address and the total data number of the addressing domain in place of specifying the final address and the top address at the setting of the addressing domain.

Figure 8:
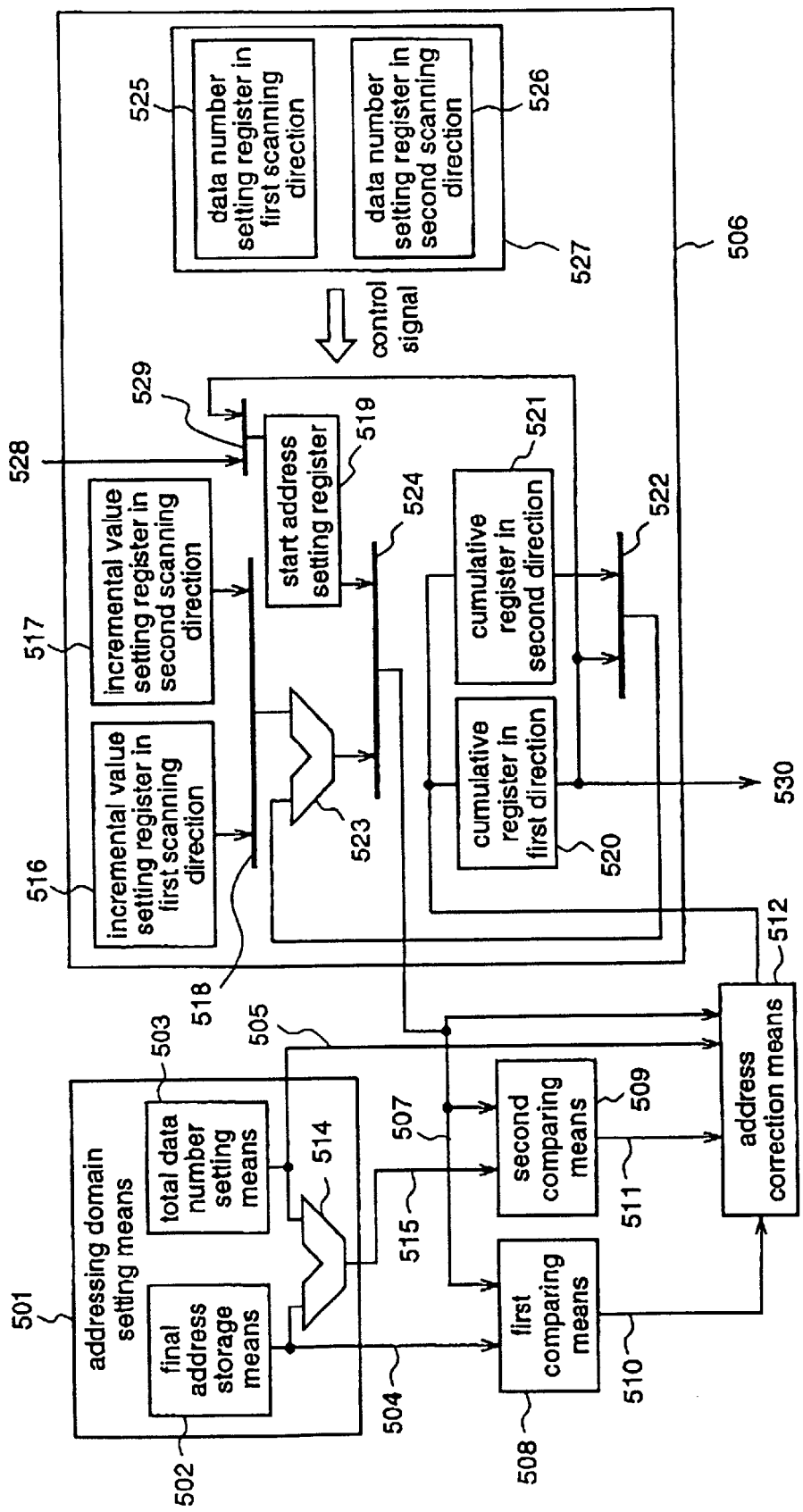
FIG. 8 is a diagram illustrating the configuration of an address generating apparatus according to a fifth embodiment of the present invention.

FIG. 8 illustrates an address generating apparatus according to the fifth embodiment of the present invention and corresponds to the invention according to claims 5, 6, and 7 of the present application. In FIG. 8, numeral 501 denotes an addressing domain setting means, numeral 502 denotes a final address storage means for storing a final address to set an addressing domain, numeral 503 denotes a total data number storage means for storing a total data number constituting the addressing domain, and by changing their setting values, the domain definition is variable, thereby enabling a scroll of the addressing domain (such as an area to be mapped in a data memory within a processor) in the memory (such as an external memory). Further, numeral 504 denotes a final address as an output of the final address storage means 502, numeral 505 denotes a total data number as an output of the total data number storage means 503, numeral 506 denotes a two-dimensional address generating means which can generate an address in an arbitrary two-dimensional rectangular area, numeral 507 denotes an address of a subsequent cycle as an output of the two-dimensional address generating means 506, numeral 508 denotes a first comparing means which performs comparison according to size with the final address 504 and the address 507 of a subsequent cycle as inputs, numeral 509 denotes a second comparing means which performs comparison according to size with the top address 515 and the address 507 of a subsequent cycle as inputs, numeral 510 denotes a first comparison result as an output of the first comparing means 508, numeral 511 denotes a second comparison result as an output of the second comparing means 509, numeral 512 denotes an address correction means which performs arithmetic operations for address correction with the total data number 505, the address 507 of a subsequent cycle, the first comparison result 510, and the second comparison result 511 as inputs, numeral 513 denotes a correction address as an output of the address correction means 512, numeral 514 denotes a subtracter which subtracts the total data number 505 from the final address 504, and numeral 515 denotes a top address obtained by subtracting the total data number 505 from the final address 504. Further, among constituent elements of the two-dimensional address generating means 506, numerals 516 and 517 denote incremental value setting registers in the first and the second scanning directions, respectively, numeral 518 denotes a first multiplexer which selects either of the outputs of the incremental value setting register 516 in the first scanning direction and the incremental value setting register 517 in the second scanning direction so as to output, numeral 519 denotes a start address setting register, numerals 520 and 521 denote a first and a second cumulative registers which correspond to the first and the second scanning directions, respectively, numeral 522 denotes a second multiplexer which selects either of the outputs of the first cumulative register 520 and the second cumulative register 521 so as to output, numeral 523 denotes an adder which adds the output of the second multiplexer 522 and the output of the first multiplexer 518, numeral 524 denotes a third multiplexer which selects either of the outputs of the adder 523 and the start address setting register 519 so as to output, numerals 525 and 526 denote data number setting registers in the first and the second scanning directions, respectively, numeral 527 denotes a control circuit which generates a control signal based on the data number setting register 525 in the first scanning direction and the data number setting register 526 in the second scanning direction, numeral 528 denotes a start address set by a user, numeral 529 denotes a fourth multiplexer which selects either of the start address 528 and the output address 539 so as to output, and numeral 530 denotes an output address as an output of the first cumulative register 520.

In this fifth embodiment, while it is different that a correction address is stored employing the cumulative register 520 in the first direction and the cumulative register 521 in the second direction which the two-dimensional address generating means 506 has, instead of an address pointer provided which stores an address corrected in the address correction means 512, and that an output of the cumulative register in the first direction is the output address 530, other configurations are the combination of the third embodiment and the fourth embodiment, and their descriptions will be omitted.

According to the fifth embodiment, in addition to the effects according to the third and the fourth embodiments are obtained, since, with respect to an address that run over the addressing domain, the correction address 513 which is corrected by the address correction means 512 is stored into the cumulative registers in the first and the second directions inside the two-dimensional address generating means 506, when a vector arithmetic operation is performed in a processor with a memory as a source or a resource, the address of a subsequent cycle outputted by the two-dimensional address generating means would not present an address in an area for which the correction by the address correction means is impossible.

In this connection, in the configurations according to the third and the fourth embodiments, the range where the correction can be performed by the address correction means when the address of a subsequent cycle run over the addressing domain is restricted to an area equivalent to an addressing domain located before the top address of the addressing domain and to an area equivalent to an addressing domain located after the final address.

Further, the fifth embodiment can also be performed combined with the second embodiment, and this will be described in FIG. 9.

Figure 9:
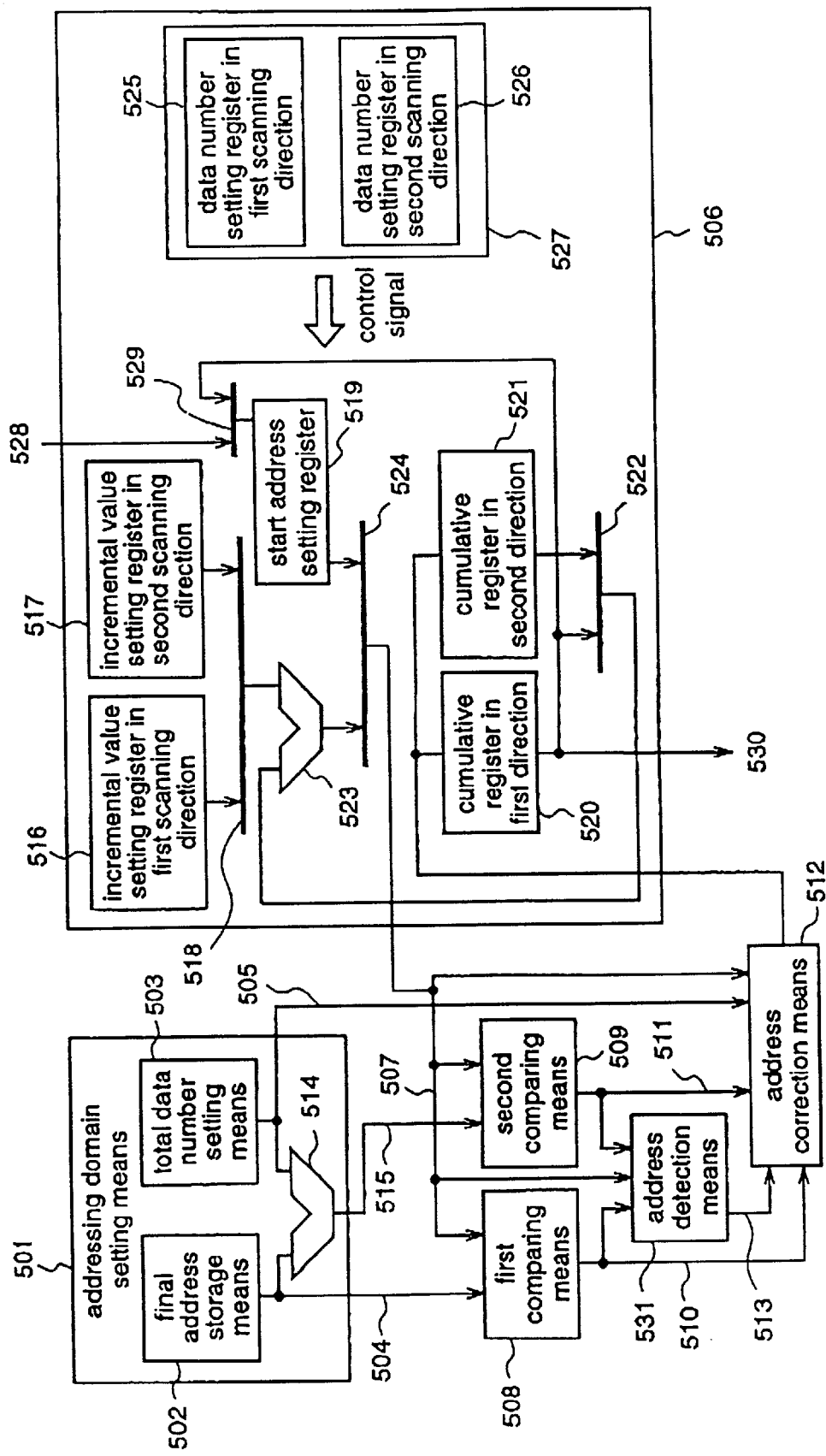
FIG. 9 is a diagram illustrating the configuration of the address generating apparatus according to the fifth embodiment of the invention.

In FIG. 9, numeral 531 denotes an address detection means, which has the final address 504 (EA), the top address 515 (SA0), the first comparison result 510 (Y), the second comparison result 511 (X), and the address 507 (A) of a subsequent cycle as inputs and detects the following two kinds of states to output a detection result 513. First, a sign bit of a calculation result (S) of $$S=EA-SA0 \qquad \text{(formula 2-3)}$$

is detected, and according to its plus or minus, a positional relationship between the final address 504 (EA) and the top address 515 (SA0) in the memory is specified.

That is, when the calculation result (S) of the (formula 2-3) is plus, the final address 504 (EA) has a larger address value than an address value of the top address 515 (SA0) as shown in FIG. 4(a), and on the contrary, when the calculation result (S) of the (formula 2-3) is minus, a large-small relationship between the final address 504 (EA) and the top address 515 (SA0) is reversed as shown in FIG. 4(b), and in this case the addressing domain reaches from the top address 515 (SA0) to the last address of a target memory as well as from an address 0 of the target memory to the final address 504 (EA).

Next, it is detected whether the address 507 (A) of a subsequent cycle, when protruding the addressing domain, run overs beyond the top address 515 (SA0), or beyond the final address 504 (EA), according to the calculation result (S) of the (formula 2-3). In this regard, beyond which it run overs is judged by which of the top address 515 (SA0) and the final address 504 (EA), the position of the address 507 (A) of a subsequent cycle in the memory area is nearer to.

As described above, the address generating apparatus can be provided which detects the address 507 of a subsequent cycle that run over the addressing domain to correct thereinto by employing the address detection means 531, even when the positional relationship between the top address 515 and the final address 504 in the memory is inverted, that is, when a setting in which the addressing domain strides the last address of the target memory is performed, can automatically generate an address of the multidimensional area which does not run over a restricted area in the data memory set by a user, can solve the contradictory problem that the DMA transfer number increases or the data memory area increases, which was a problem in a conventional multidimensional address generating means, since it is only required to subject DNA transfer to required data only, when the addressing domain is to run over an area set by a user, and can suppress an increase in the data memory area without causing an increase in the circuit scale or in the CPU processing, nor restricting the first existence position or shape of an area to run over.

Figure 10:
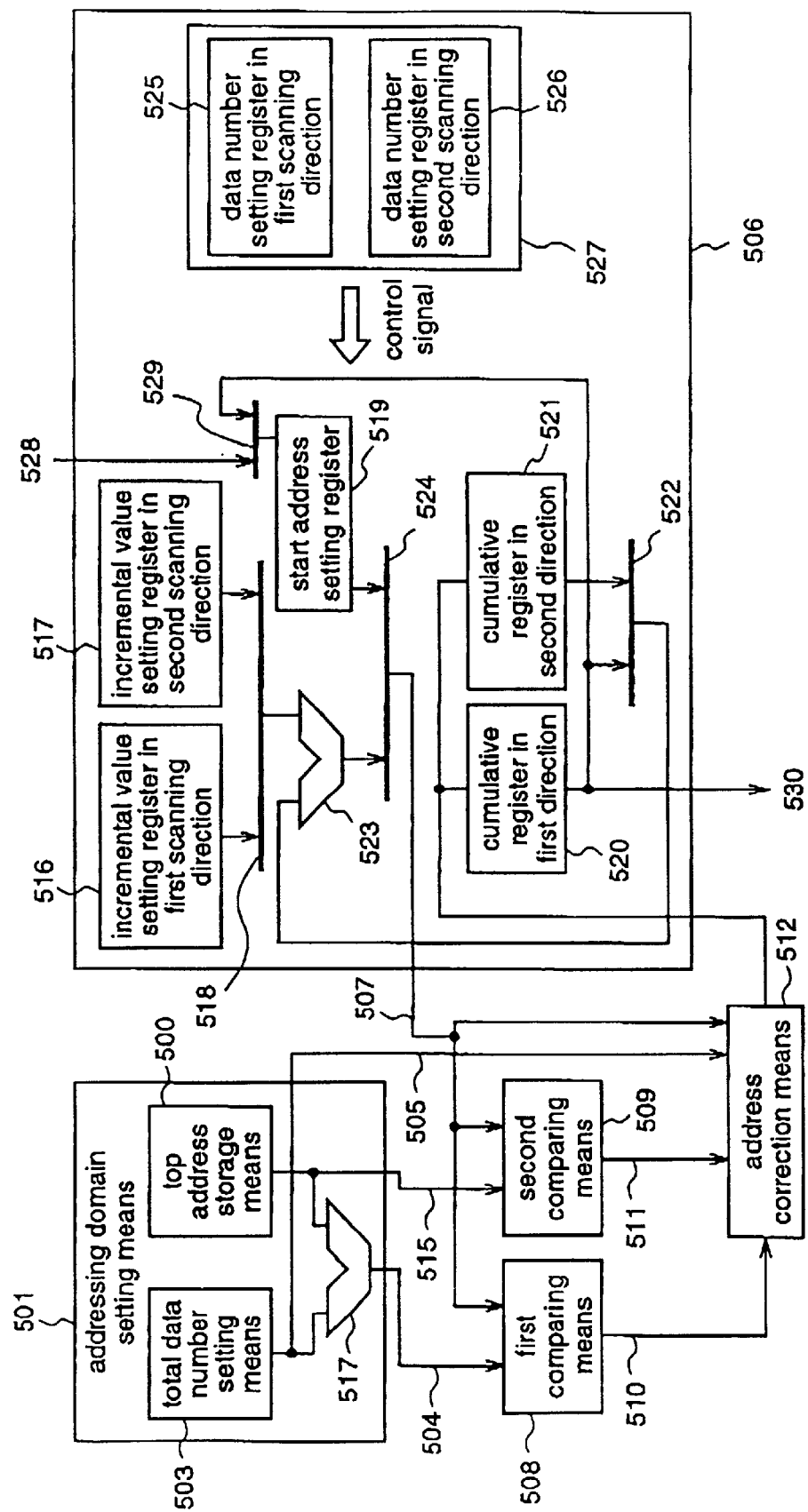
FIG. 10 is a diagram illustrating the configuration of the address generating apparatus according to the fifth embodiment of the invention.

Further, it is also possible that the top address and the total data number of the addressing domain are set, thereby to set the addressing domain as shown in FIG. 10.

In FIG. 10, numeral 501 denotes the addressing domain setting means, numeral 503 denotes the total data number storage means for storing the total data number constituting the addressing domain, numeral 500 denotes a top address storage means for storing the top address for setting the addressing domain, numeral 517 denotes an adder which adds the total data number 515 to the top address 505, and others are the same as those shown in FIG. 5.

In FIG. 10, while it is different from the fourth embodiment that a method of setting the addressing domain is changed from one that comprises setting the final address and the top address to one that comprises setting the top address and the total data number, and that the final address is calculated automatically by the adder provided, other configurations are the same as those in the fourth embodiment and their operations will be described briefly here.

That is, the total data number 505 as an output of the total data number storage means 503 which stores the total data number of the addressing domain is inputted to the adder 517 and is subjected to an addition with the top address 515 so that the final address 504 is calculated, as well as is inputted to the address correction means 512 so that calculations for the correction addresses are performed as described in the formulas 3-1 and 3-2.

As described above, according to the address generating apparatus in FIG. 10, the addressing domain that a user sets is set by the top address and the total data number, whereby the address correction calculation performed by the address correction means 512 can be simplified, resulting in a reduction of the hardware scale.

Figure 11:
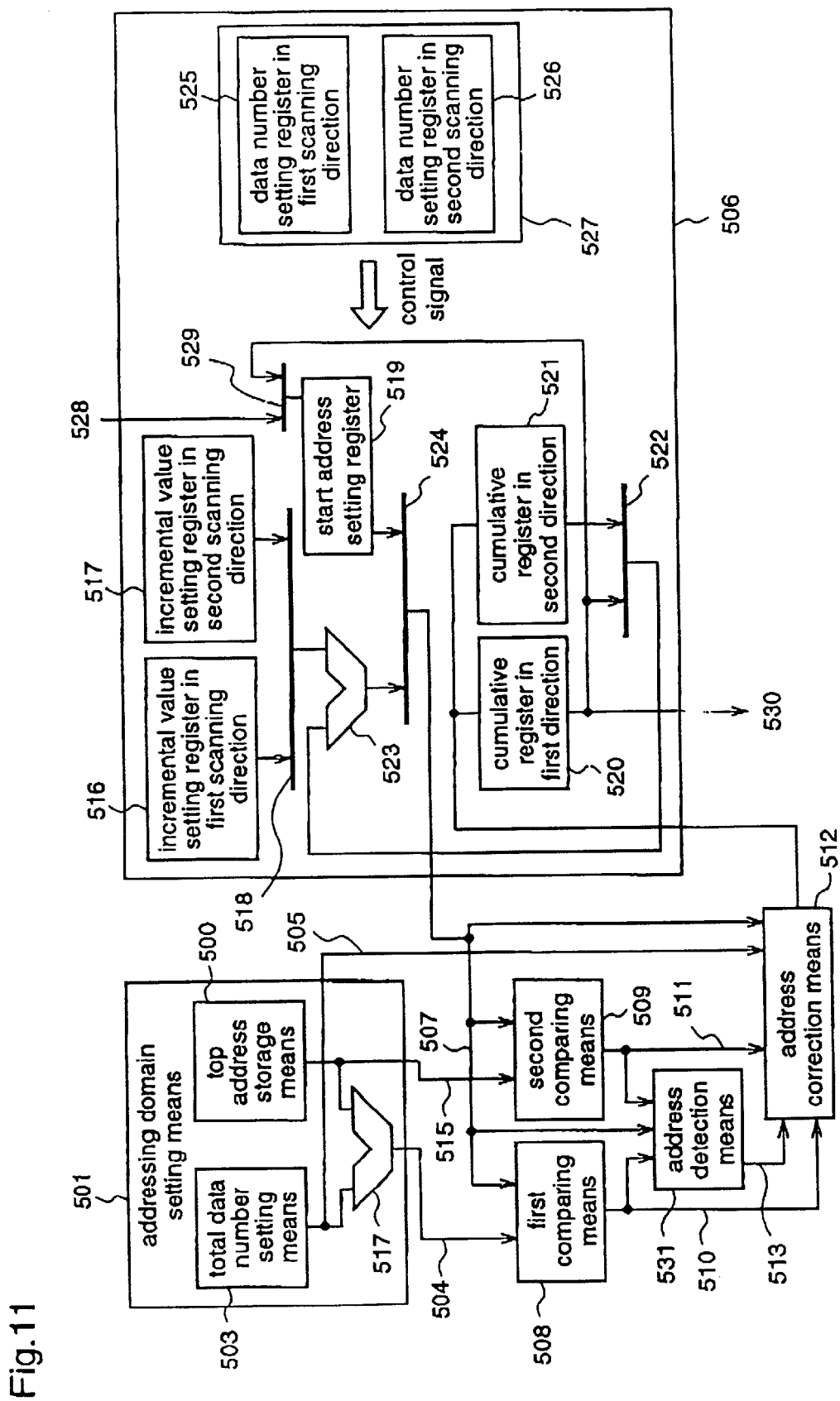
FIG. 11 is a diagram illustrating the configuration of the address generating apparatus according to the fifth embodiment of the invention.

Further, as shown in FIG. 11, it is also possible to provide the address detection means 531 in FIG. 10, whereby the address 507 of a subsequent cycle that run over the addressing domain can be detected and corrected into the addressing domain even when a setting in which the addressing domain strides the last address of the target memory is performed, and an address in the multidimensional area can be generated automatically without running over a restricted area in the data memory set by a user.

(Embodiment 6)

This sixth embodiment provides a construction which enables switching between a mode of outputting an address subjected to address correction and a mode of outputting a conventional two-dimensional address as it is.

Figure 12:
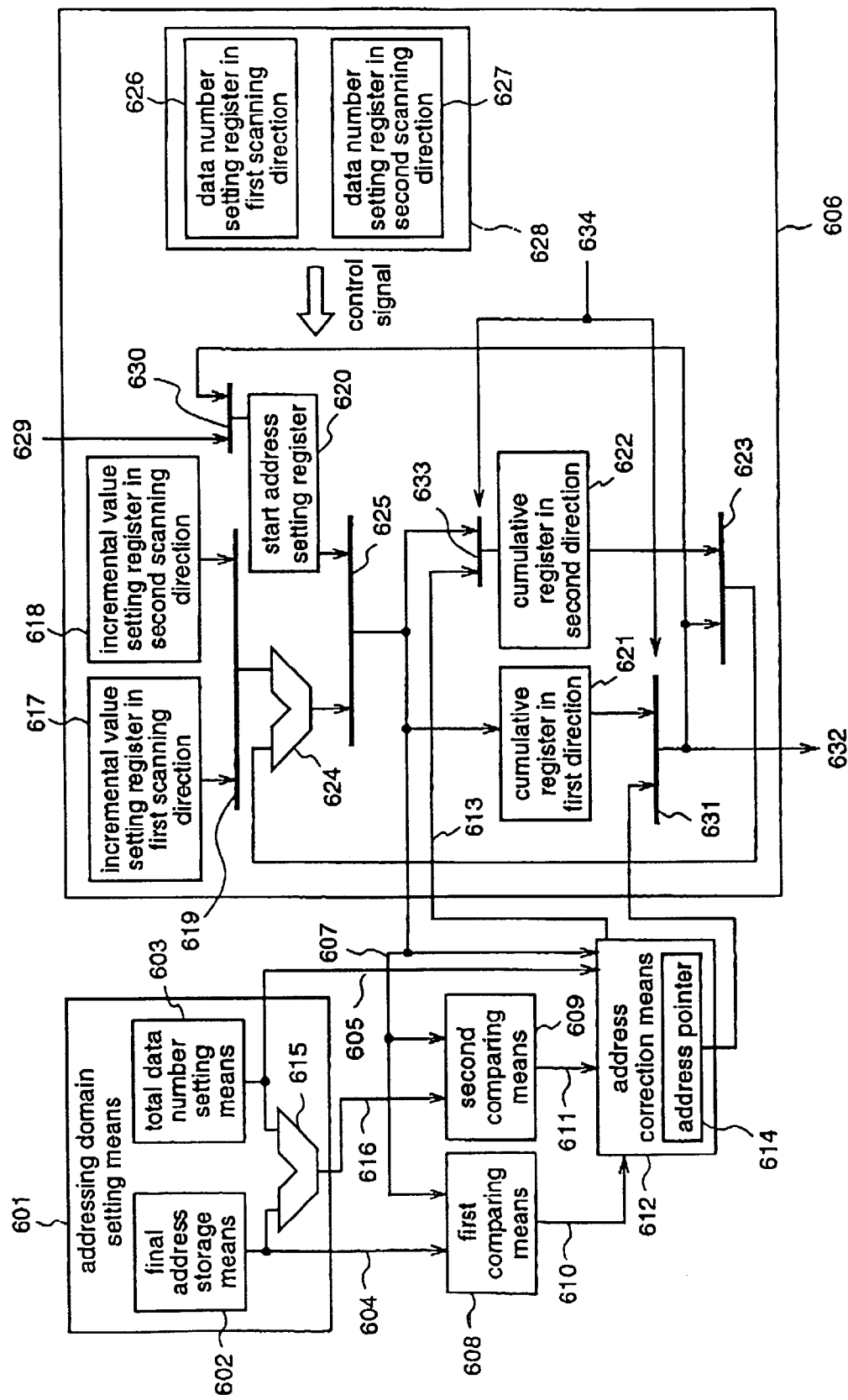
FIG. 12 is a diagram illustrating the configuration of an address generating apparatus according to a sixth embodiment of the present invention.

FIG. 12 illustrates an address generating apparatus according to the sixth embodiment of the present invention and corresponds to the invention according to claims 8, 9, and 10 of the present application. In FIG. 12, numeral 601 denotes an addressing domain setting means, numeral 602 denotes a final address storage means for storing a final address to set an addressing domain, numeral 603 denotes a total data number storage means for storing a total data number constituting the addressing domain, and by changing their setting values, the domain definition is variable, thereby enabling a scroll of the addressing domain (such as an area to be mapped in a data memory within a processor) in the memory (such as an external memory). Further, numeral 604 denotes a final address as an output of the final address storage means 602, numeral 605 denotes a total data number as an output of the total data number storage means 603, numeral 606 denotes a two-dimensional address generating means which can generate an address in an arbitrary two-dimensional rectangular area, numeral 607 denotes an address of a subsequent cycle as an output of the two-dimensional address generating means 606, numeral 608 denotes a first comparing means which performs comparison according to size with the final address 604 and the address 607 of a subsequent cycle as inputs, numeral 609 denotes a second comparing means which performs comparison according to size with the top address 616 and the address 607 of a subsequent cycle as inputs, numeral 610 denotes a first comparison result as an output of the first comparing means 608, numeral 611 denotes a second comparison result as an output of the second comparing means 609, numeral 612 denotes an address correction means which performs arithmetic operations for address correction with the total data number 605, the address 607 of a subsequent cycle, the first comparison result 610, and the second comparison result 611 as inputs, numeral 613 denotes a correction address as an output of the address correction means 612, numeral 614 denotes an address pointer which has the correction address 613 as an input, numeral 615 denotes a subtracter which subtracts the total data number 605 from the final address 604, and numeral 616 denotes a top address obtained by subtracting the total data number 605 from the final address 604. Further, among constituent elements of the two-dimensional address generating means 606, numerals 617 and 618 denote incremental value setting registers in the first and the second scanning directions, respectively, numeral 619 denotes a first multiplexer which selects either of the set values of the incremental value setting register 617 in the first scanning direction and the incremental value setting register 618 in the second scanning direction so as to output, numeral 620 denotes a start address setting register, numerals 621 and 622 denote a first and a second cumulative registers which correspond to the first and the second scanning directions, respectively, numeral 623 denotes a second multiplexer which selects either of the outputs of an after-mentioned fifth multiplexer 631 and the second cumulative register 622 so as to output, numeral 624 denotes an adder which adds the output of the second multiplexer 623 and the output of the first multiplexer 619, numeral 625 denotes a third multiplexer which selects either of the outputs of the adder 624 and the start address setting register 620 so as to output, numerals 626 and 627 denote data number setting registers in the first and the second scanning directions, respectively, numeral 628 denotes a control circuit which generates a control signal based on the set values of the data number setting register 626 in the first scanning direction and the data number setting register 627 in the second scanning direction, numeral 629 denotes a start address set by a user, numeral 630 denotes a fourth multiplexer which selects either of the start address 629 set by a user and the output address 632 so as to output, numeral 631 denotes a fifth multiplexer which selects either of the outputs of the first cumulative register 621 and the address pointer 614 so as to output, numeral 632 denotes an output address as an output of the fifth multiplexer 631, numeral 633 denotes a sixth multiplexer which selects either of the address 607 of a subsequent cycle and the correction address 613 so as to output, and numeral 634 denotes a mode switching signal as a selection signal of multiplexers, the fifth multiplexer 631 and the sixth multiplexer 633.

In the sixth embodiment, while it is different that the fifth multiplexer 631 and the sixth multiplexer 633 are provided which are switched by the mode switching signal that switches to output an address subjected to correction or to output a conventional two-dimensional address as it is, when protruding the addressing domain, whereby it can be selected by the sixth multiplexer which of the address 607 of a subsequent cycle and the correction address 614 is to be an output of the cumulative register in the second direction, as well as it can be selected select by the fifth multiplexer 631 which of the outputs of the address pointer 614 and the cumulative register 621 in the first direction is to be an output of the output address 632, other configurations are the same as the combination of the third embodiment and the fourth embodiment, and their descriptions will be omitted here.

With such configuration, when the mode switching signal indicates a regular mode of two-dimensional address generation, the sixth multiplexer 633 selects the address 607 of a subsequent cycle and the fifth multiplexer 631 selects the output of the cumulative register 621 in the first direction for the output address 632, thereby generating an address having no relation to the range of the addressing domain specified in the addressing domain setting means 601.

Further, when the mode switching signal indicates an addressing mode of no protrusion from the addressing domain, the sixth multiplexer 633 selects the correction address 613 and the fifth multiplexer 631 selects the output of the address pointer 614, whereby one which is corrected so as not to run over the addressing domain becomes the output address 632.

As described above, according to the sixth embodiment, in addition to the effect corresponding to the third embodiment is obtained, that when the addresses generated by the two-dimensional address generating means 606 should run over an area in the addressing domain setting means 601 set by a user, a correction calculation of the addresses is automatically performed by the address correction means 612, supposing the addressing domain to be a spiral annular space with an address subsequent to the final address as the top address of the addressing domain, thereby the output address can be made always remain in the addressing domain set by a user, the contradictory problem that the DMA transfer number increases when the data memory area used is suppressed while the data memory area increases when the DMA transfer number is suppressed can be solved, an increase in the data memory area can be suppressed without increasing the circuit scale and the processes by CPU, and further the initially existing position and shape of an area which is to run over are not restricted, and further, the address correction calculation performed by the address correction means 612 can be simplified, resulting in reduction in the hardware scale, since the addressing domain set by a user is set by the final address and the total data number, and in addition to the effect according to the fourth embodiment is obtained, that when a start address of a two-dimensional rectangular area to be accessed by a user should run over the addressing domain, an address corrected by the address correction means 612 is outputted as the output address 632, and the value of the start address 629 set by d user is overwritten by the output address 632 which has actually accessed the memory while outputting the output address 632 that is corrected by the address correcting means 612 since the fourth multiplexer 630 is provided which writes the output address 632 at the first cycle when the addressing is started into the start address setting register 620 which sets the start address while setting the two-dimensional rectangular area which is to be accessed by a user, thereby enabling performing subsequent accesses with the corrected address as a start address, since a construction is provided in which, when the user wants to, after he performs setting to the addressing domain setting means 601 and performs a processing of generating a two-dimensional address which should not run over the addressing domain, perform usual processing of generating a two-dimensional address that has no relation to the addressing domain, he can perform switching of the mode switching signal thereby to easily switch the functions, thereby reducing the processing amount, while the generation of corrected addresses and generation of addresses not corrected can be carried out by the same circuit.

As described above, the address generating apparatus according to the sixth embodiment can be switched easily to a conventional regular multidimensional address generating apparatus by the, mode switching signal, whereby it can be used not only for a specific application but also for the whole processors that perform vector operations to a rectangular area as a high function address generating apparatus.

Figure 13:
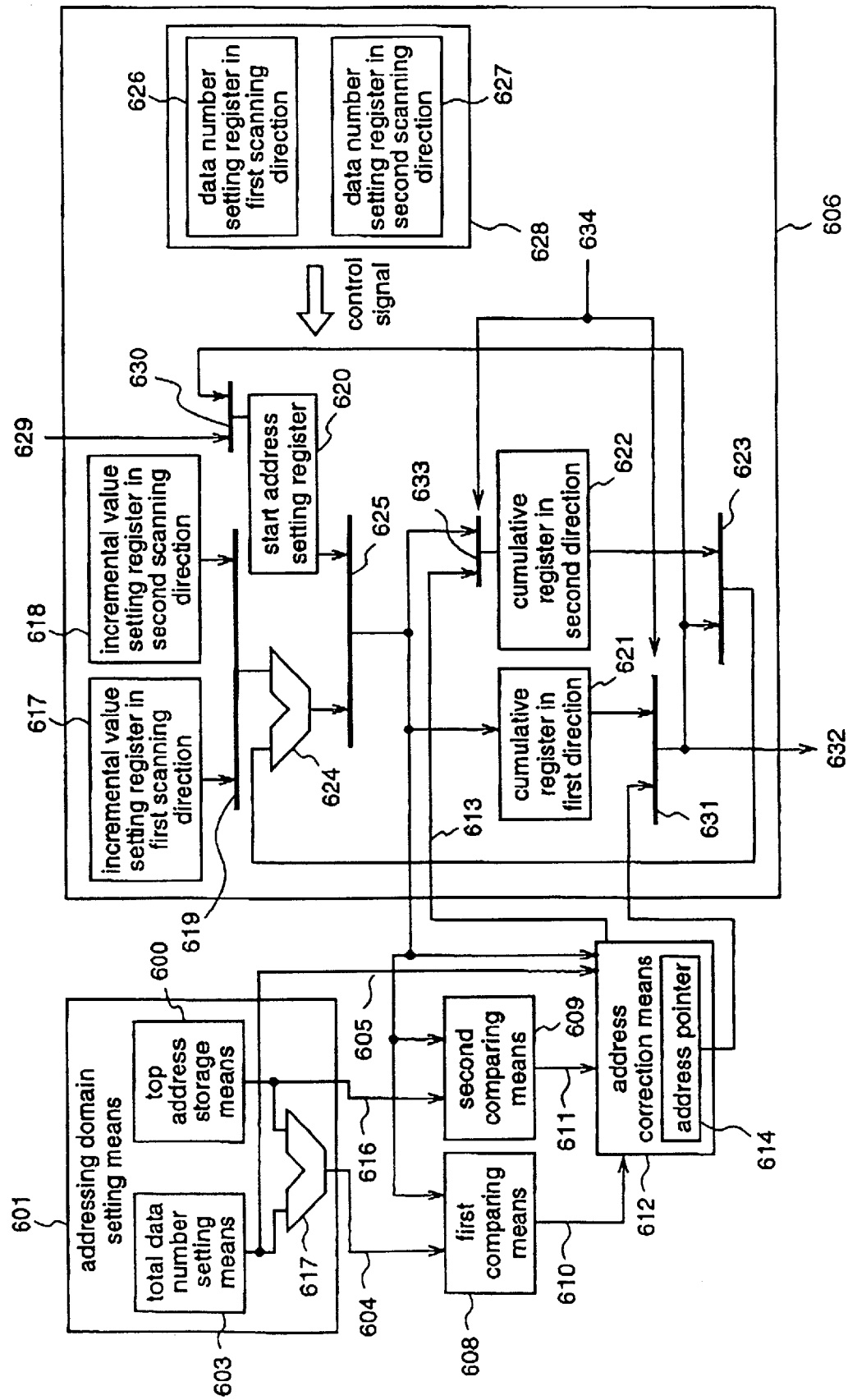
FIG. 13 is a diagram illustrating the configuration of the address generating apparatus according to the sixth embodiment of the invention.

Further, it is also possible that the top address and the total data number of the addressing domain are set, thereby to set the addressing domain as shown in FIG. 13.

In FIG. 13, numeral 601 denotes the addressing domain setting means, numeral 603 denotes the total data number storage means for storing the total data number constituting the addressing domain, numeral 600 denotes a top address storage means for storing the top address for setting the addressing domain, numeral 617 denotes an adder which adds the total data number 605 to the top address 616, and others are the same as those shown in FIG. 12.

In FIG. 13, while it is different from the sixth embodiment that a method of setting the addressing domain is changed from one that comprises setting the final address and the top address to one that comprises setting the top address and the total data number, and that the final address is calculated automatically by the adder provided, other configurations are the same as those in the sixth embodiment and their operations will be described briefly here.

That is, the total data number 605 as an output of the total data number storage means 603 which stores the total data number of the addressing domain is inputted to the adder 617 and is subjected to an addition with the top address 616 so that the final address 604 is calculated, as well as is inputted to the address correction means 612 so that calculations for the correction addresses are performed as described in the formulas 3-1 and 3-2.

As described above, according to the address generating apparatus in FIG. 13, the addressing domain that a user sets is set by the top address and the total data number, whereby the address correction calculation performed by the address correction means 612 can be simplified, resulting in reduction in the hardware scale.

Further, it is also possible to apply the fifth multiplexer and the sixth multiplexer shown in FIG. 12 to the apparatuses of the fourth and the fifth embodiments shown in FIGS. 7 to 11, so as to provide a mode of generating corrected addresses and a mode of generating addresses which would not be corrected.
(Embodiment 7)

This seventh embodiment provides a motion vector detector which performs motion vector detection employing an address generating apparatus.

Figure 14:
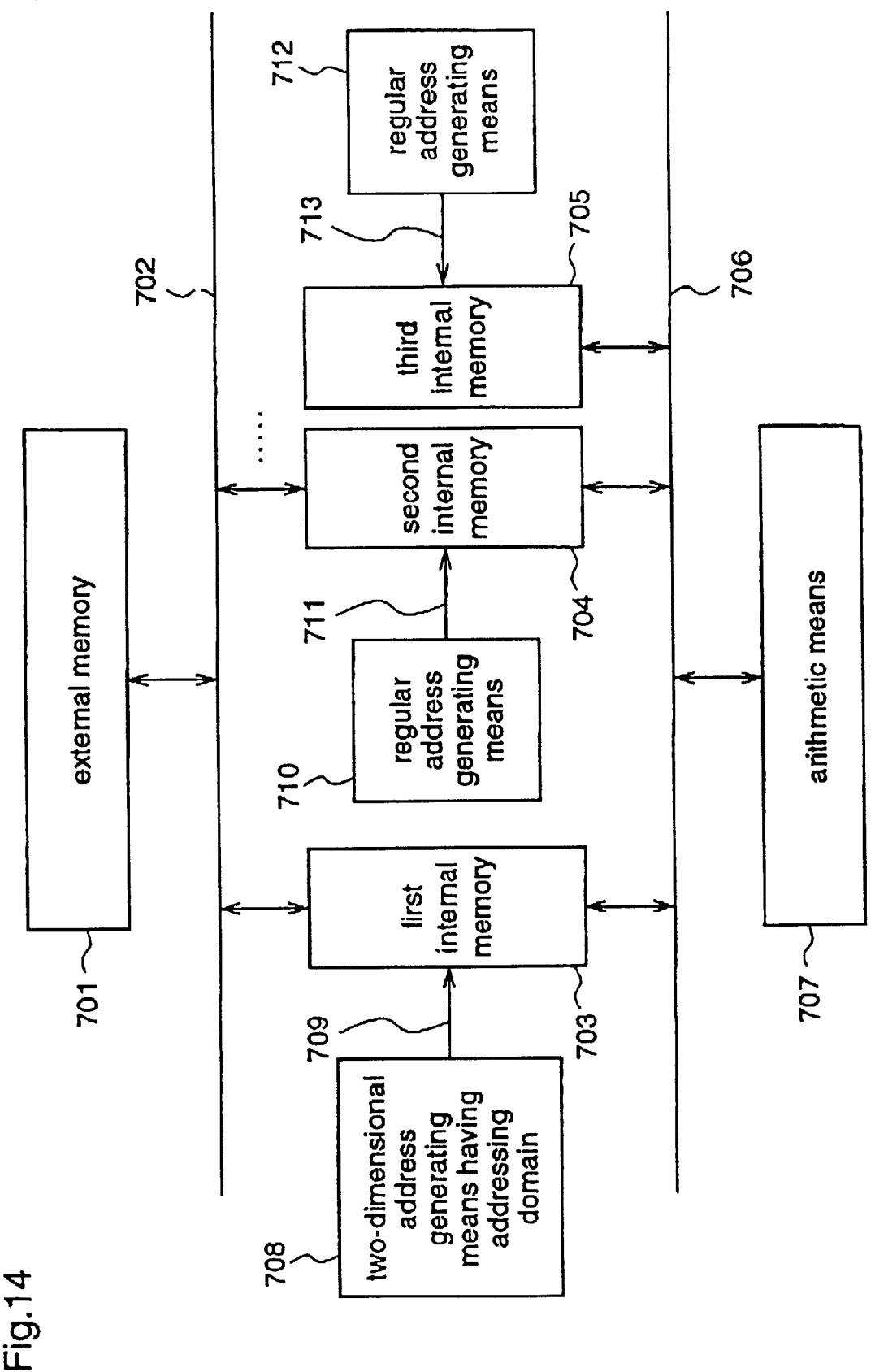
FIG. 14 is a diagram illustrating the configuration of a motion vector detector according to a seventh embodiment of the present invention.

FIG. 14 illustrates a processor as a motion vector detector according to the seventh embodiment of the present invention, and corresponds to the invention according to claim 11 of the present application. In FIG. 14, numeral 701 denotes an external memory located outside a processor, numeral 702 denotes a bus for transferring DMA data which performs data transfer between the external memory 701 and an after-mentioned internal memory, numeral 703 denotes a fist internal memory as a data memory located inside the processor, numerals 704 and 705 similarly denote a second and a third internal memories as data memories located inside the processor, numeral 706 denotes a bus for internal arithmetic operations which exchanges data between the internal memory and an after-mentioned arithmetic means, numeral 707 denotes an arithmetic means, and numeral 708 denotes an address generating apparatus which allows a user to specify an addressing domain and generates a two-dimensional address which does not run over the addressing domain, and it is preferable that the address generating apparatus in FIG. 12 is employed, while the address generating apparatus in FIGS. 1, 3, 5, 6, 7, 8, 9, 10, 11, and 13 can also be employed. Numeral 709 denotes an address of the first internal memory, numerals 710 and 712 denote regular address generating means, numeral 711 denotes an address of the second internal memory, and numeral 713 denotes an address of the third internal memory.

Next, the operation will be described. In image data stored in the external memory 701, data required for searching, that are among objective image data to be subjected to motion victor detection, are transferred to the first internal memory through the bus 702 for transferring DMA data. Arithmetic operations for motion vector detection are performed in the arithmetic means 707 through the bus 706 for internal arithmetic operations.

A description will be given of a case with reference to FIGS. 14 to 17 where searching of motion vectors that employs One at a time algorithm described in the prior act is performed in the processor employing an address generating apparatus, that is, the motion vector detector according to the seventh embodiment even during a processing of motion vector detection being preformed in the image CODEC processing. In FIG. 14, among the objective image data to be searched which are stored in the external memory 701, data in a rectangular area comprising 18×18 pixels, which includes pixels for one macro block and pixels of respective ones therearound, are transferred to the first internal memory 703 by DMA transfer. This is for reserving an image area required for calculating SAD values of a retrieval origin and eight pixels adjacent thereto. At this time, a user locates an area which stores data for 18×18 pixels in a memory by the two-dimensional address generating means 708 having an addressing domain which generates the address 709 of the first internal memory 703, and sets this as an addressing domain to the first internal memory.

According to the process as described above, 16×16 pixels as the center of the pixel data located in the first internal memory 703 become the first retrieval origin. Further, macro block data as an object of motion vector processing are located in the second internal memory 704. Next, a user precedently performs setting such that the two-dimensional address generating means 708 having an addressing domain makes the regular address generating means 710 access a rectangular area of 16×16 pixels as an objective image data to be subjected to SAD calculation, and an instruction for the SAD value calculation in which the first internal memory 703 and the second internal memory 704 as two sources are issued.

Figure 15:
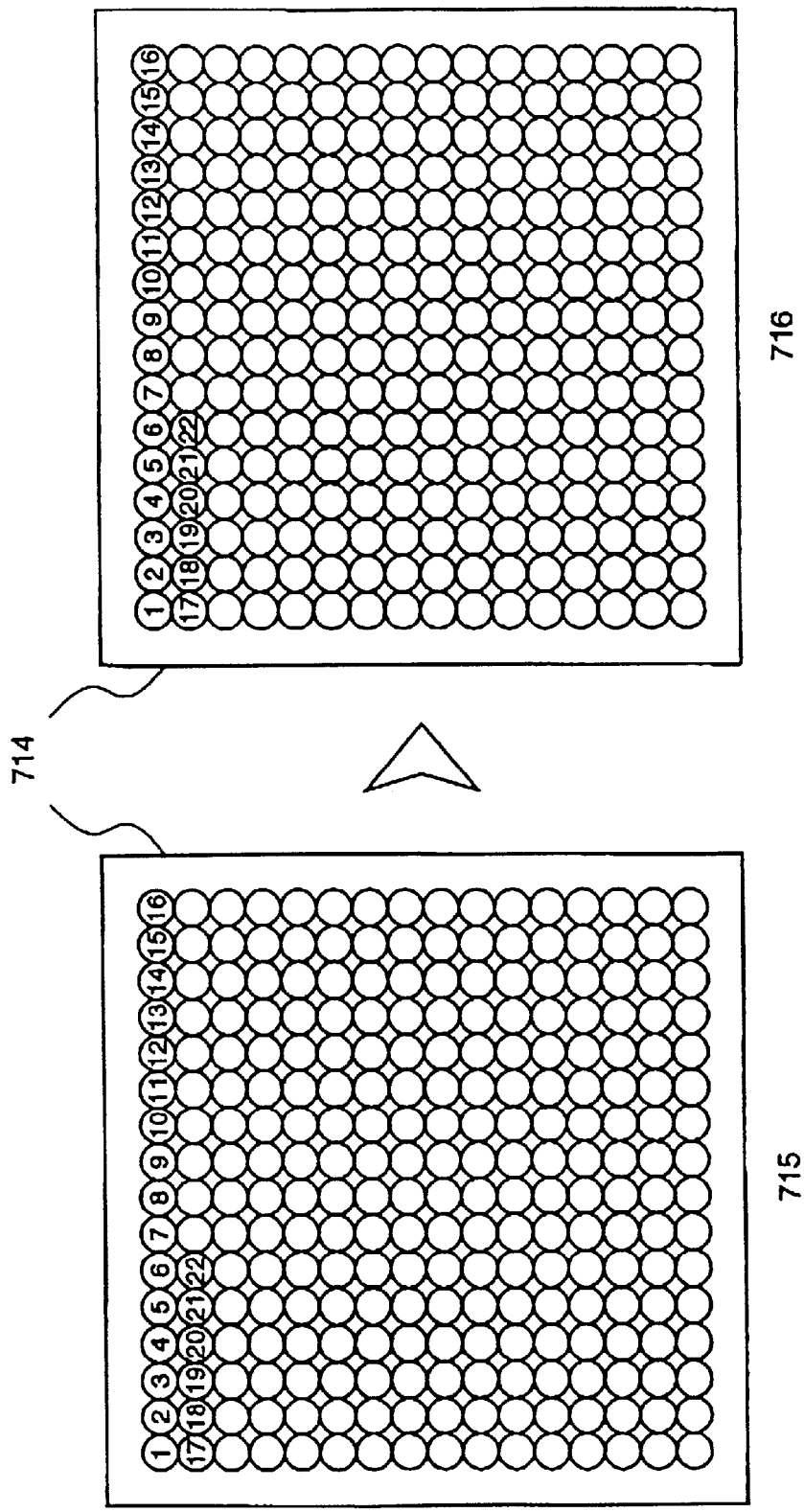
FIG. 15 is a conceptual diagram illustrating a memory access method according to the seventh embodiment of the invention.

FIG. 15 illustrates the state of the first internal memory 703 at this point. Numeral 714 denotes an addressing domain of 18×18 pixels which a user sets to the first internal memory 703, numeral 715 denotes a setting of two-dimensional addresses performed by a user to access a retrieval origin, and numeral 716 denotes addresses actually generated by the two-dimensional address generating means 708 having an addressing domain. That is, 16×16 data are accessed in a rectangular area sequentially from 1 of the access setting 715, and addresses of the first internal memory 703 are generated sequentially from 1 of the generation address 716.

The calculation of SAD value is performed by the arithmetic means 707 and this is stored in a resource through the bus for internal arithmetic operations. The abovementioned processing is also performed to the eight pixels adjacent to the retrieval origin in the first internal memory 703 sequentially. At this time, a user performs setting only to the two-dimensional address generating means 708 having an addressing domain such that the start address of the two-dimensional rectangular area to be accessed, that is, the address value 1 of the access setting 715 in FIG. 15 is shifted by pixels to right, left, up, down, diagonally to the upper right, diagonally to the lower right, diagonally to the upper left, and diagonally to the lower left, thereby to perform similar arithmetic operations.

Figure 16:
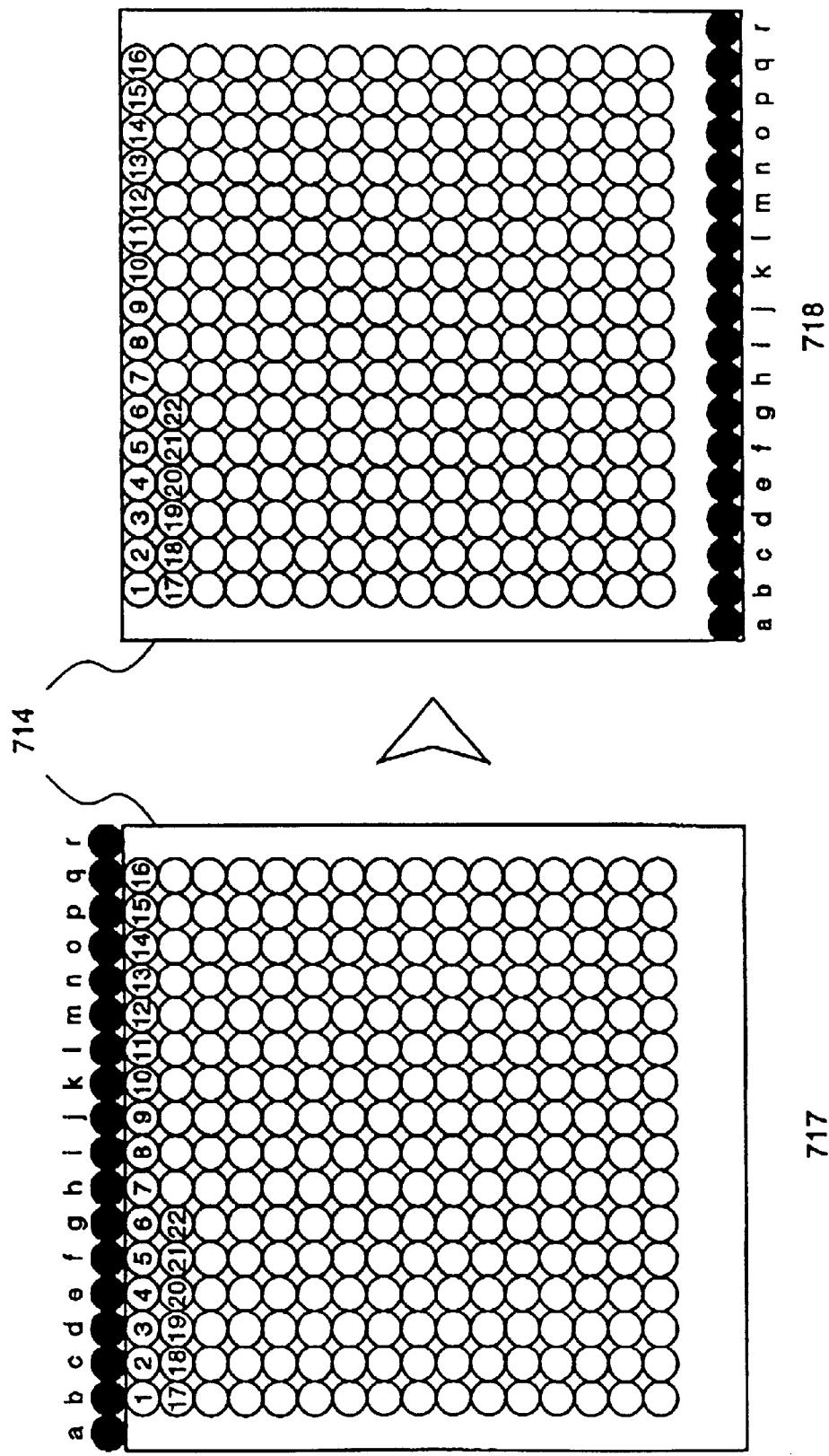
FIG. 16 is a conceptual diagram illustrating a memory access method according to the seventh embodiment of the invention.

Next, when a macro block one pixel above is found as a new retrieval origin, it becomes an access setting 717 as shown in FIG. 16. However, in order to search eight pixels adjacent to the new retrieval origin, new pixel data a to r denoted by "●" are newly required for the access setting 717 in FIG. 16 which is set by an addressing domain setting means of the address generation means 708, and therefore, pixels are supplied from the external memory 701 by DMA transfer. At this time, a setting of accessing a to r denoted by "●" in the access setting 717 is performed by the two-dimensional address generating means of the address generating means 708 as a setting performed by a user, whereby addresses of a to r denoted by "●" in a generation address 718 are generated through a function of correcting addresses protruding the addressing domain (717) as addresses to be generated actually. Also in case of performing arithmetic operations to obtain the SAD value, a to r of the generation address 718 are accessed automatically when addresses for accessing a to r of the access setting 717 are set also for an addressing of two-dimensional addresses.

Figure 17:
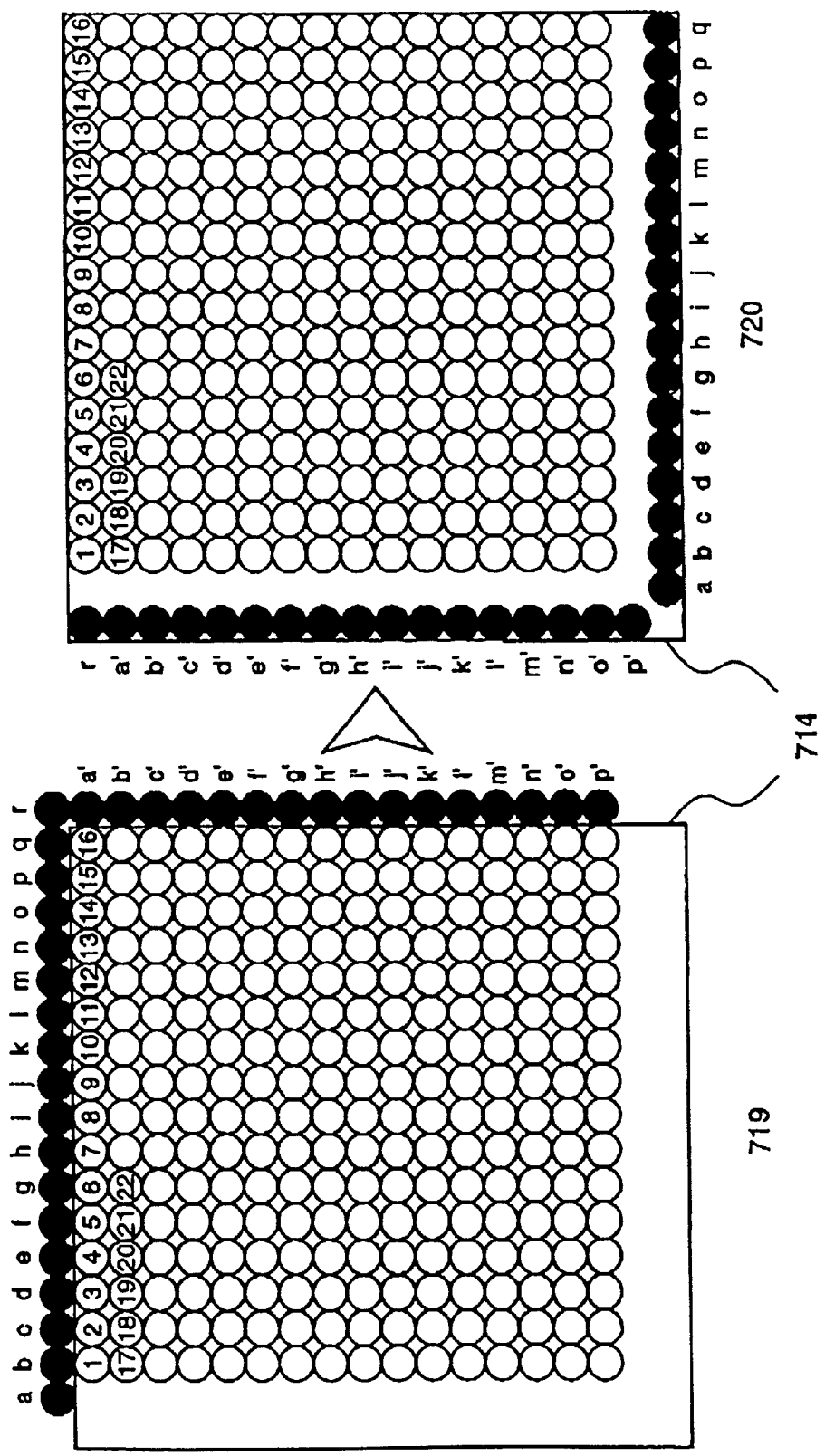
FIG. 17 is a conceptual diagram illustrating a memory access method according to the seventh embodiment of the invention.
Figure 18:
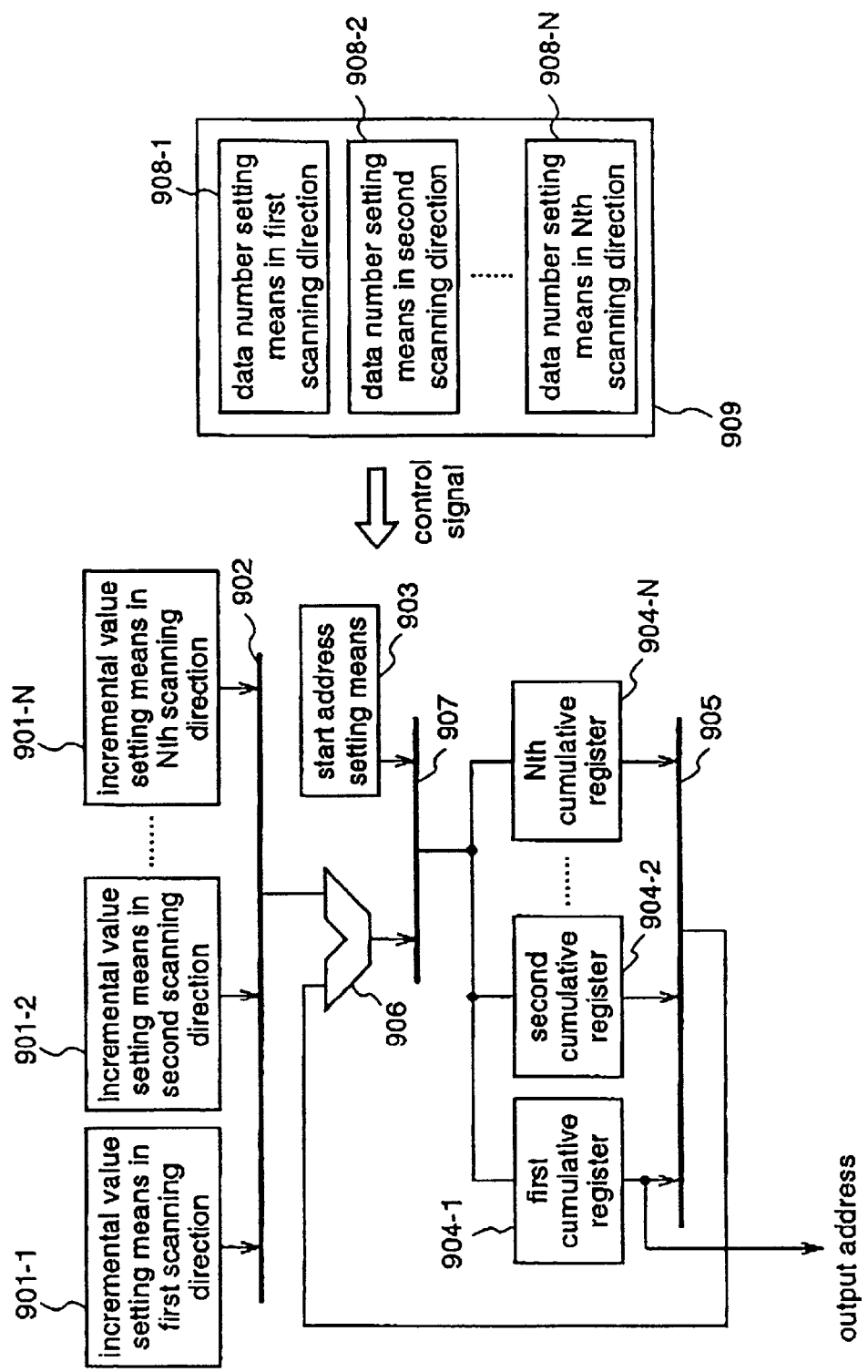
FIG. 18 is a diagram illustrating the configuration of a conventional address generating apparatus.
Figure 19:
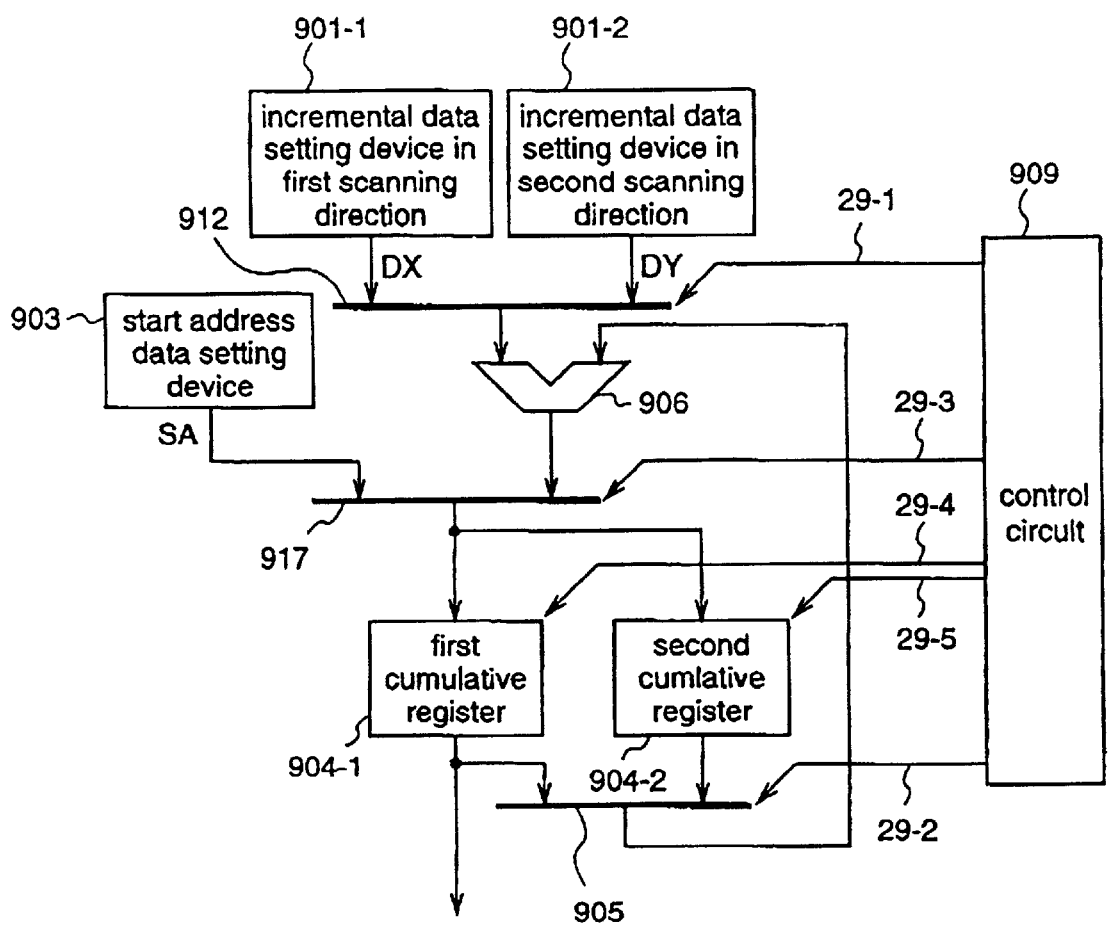
FIG. 19 is a diagram illustrating the configuration of the conventional address generating apparatus.
Figure 20:
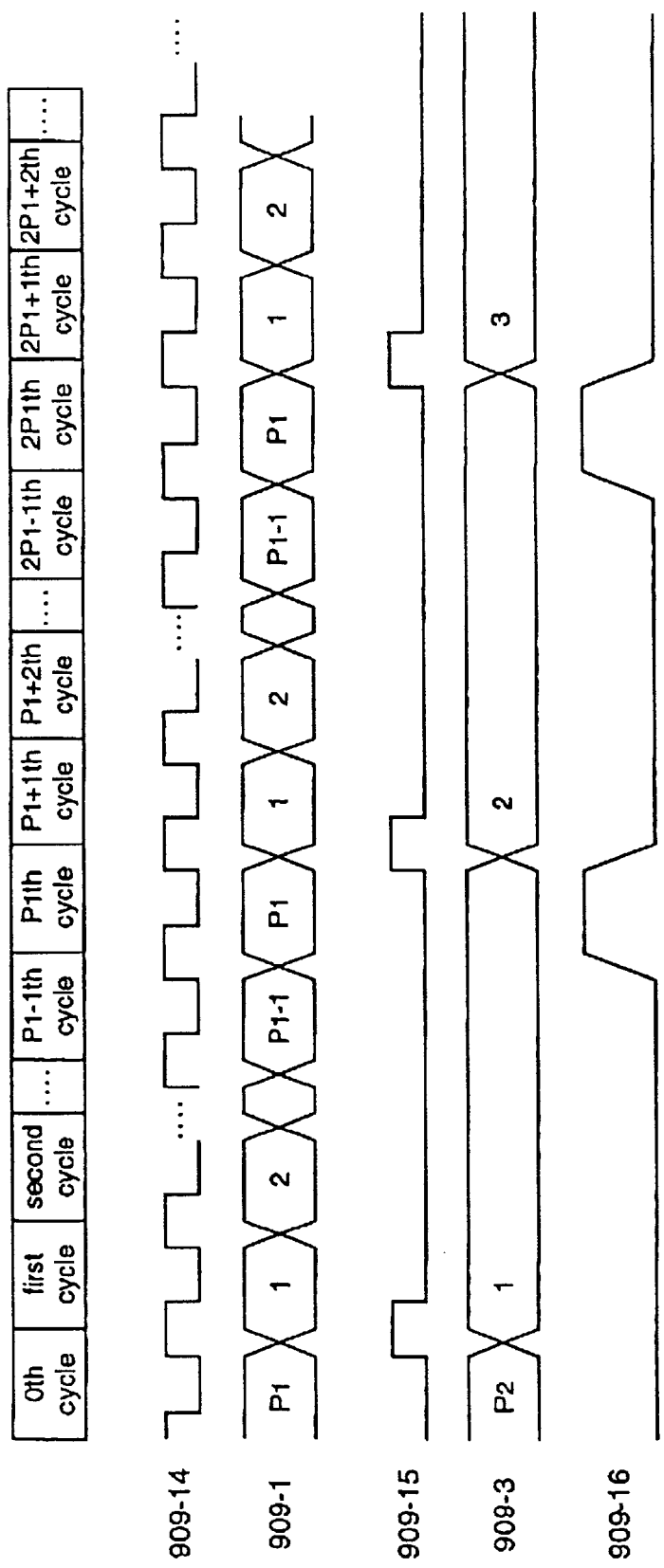
FIG. 20 is a diagram illustrating a data flow of the conventional address generating apparatus.
Figure 21:
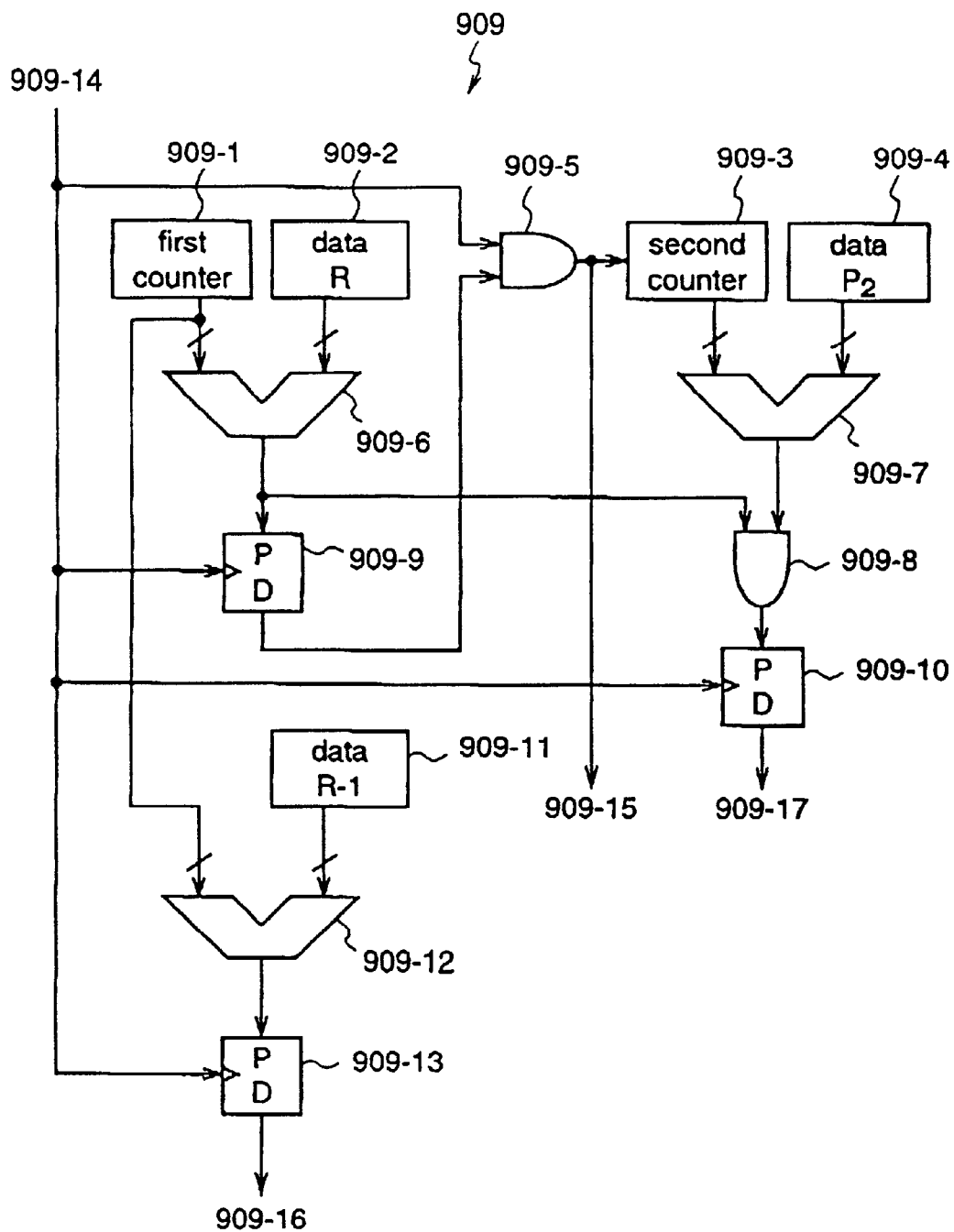
FIG. 21 is a diagram showing an example of a control circuit of the conventional address generating apparatus.
Figure 22:
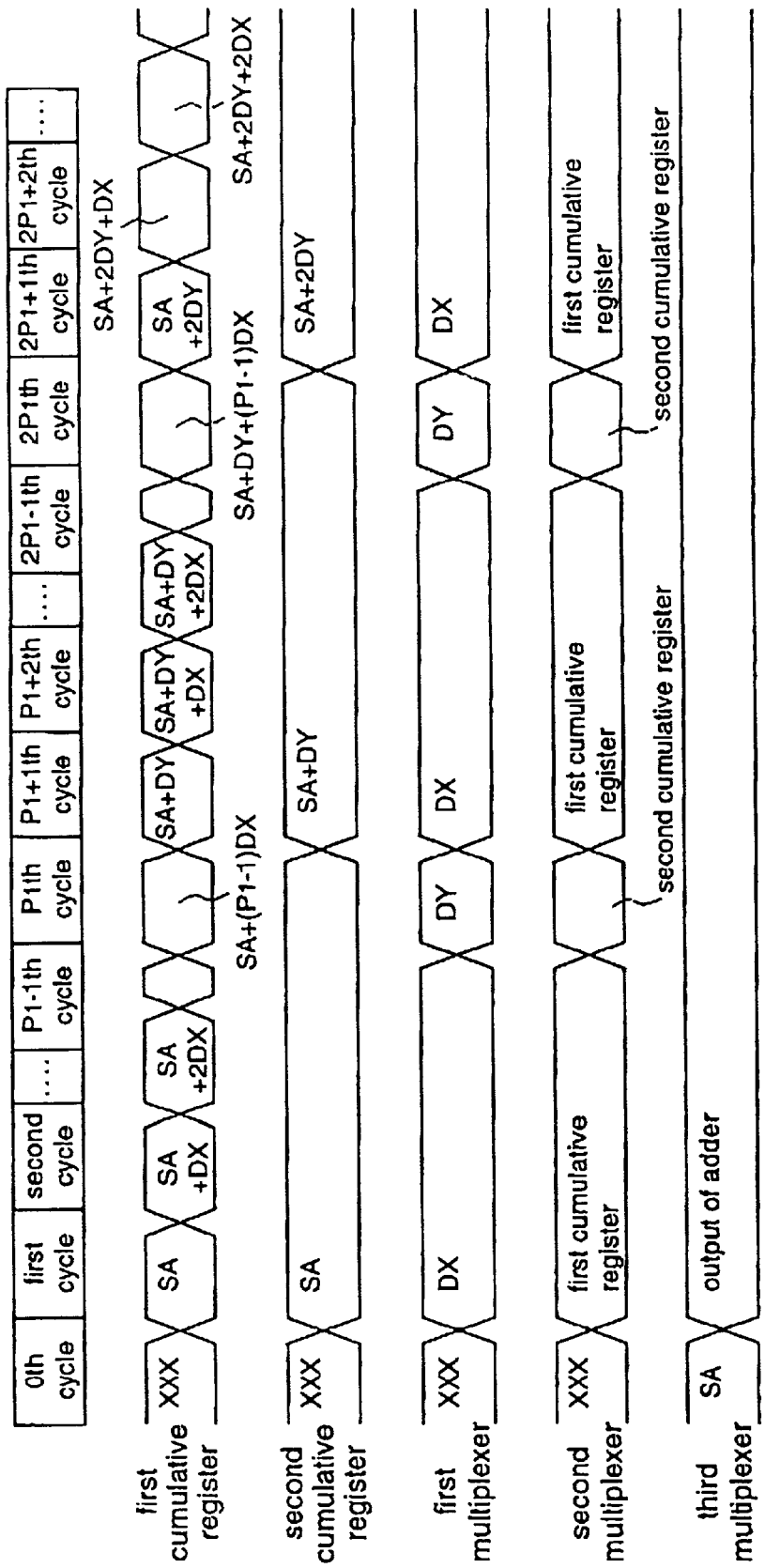
FIG. 22 is a diagram showing an example of the control circuit of the conventional address generating apparatus.
Figure 25:
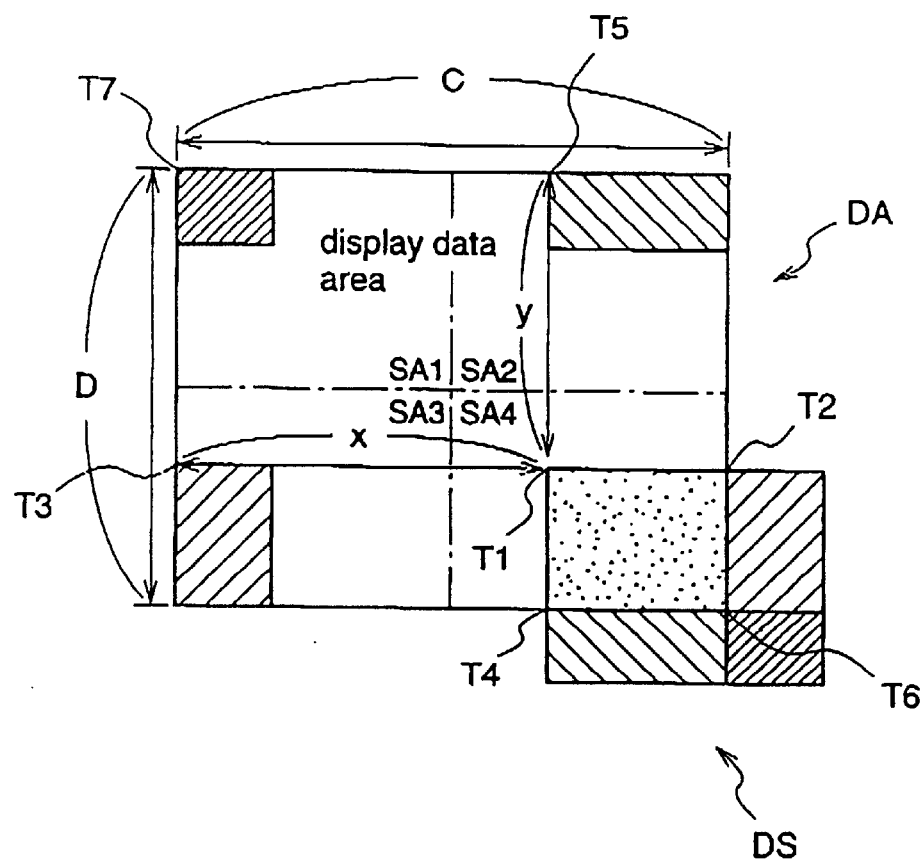
FIG. 25 is a diagram illustrating a relationship of an address of a frame memory when a display screen traverses the boundary of a display data area of a conventional graphic display scroll device.

FIG. 17 illustrates, for reference, an access setting 719 and a generation address 720 when a retrieval origin moves to a micro block diagonally upper right by one pixel.

As described above, according to the seventh embodiment, it is possible to perform scrolling of image data located in the external memory with an area specified in an addressing domain of the internal memory as a window. Thereby, a user decides an area in the internal memory to be used according to the addressing domain, resulting in a prevention of an increase in the amount of memory occupied by the motion vector detection processing.

Further, since it is only needed to supply pixels being short by that the retrieval origin moved, in a case where data in a rectangular area of 18×18 pixels are subjected to DMA transfer, for example, transferring data of 35 (=18+18−1) pixels only, which are denoted by "●" in FIG. 17, is required in the seventh embodiment, while transferring data of 324 (=18×18) pixels is actually required, thereby preventing an increase in a data number of DMA transfer.

Further, a user may perform a usual access setting without recognizing an access being performed running over the addressing domain, thereby suppressing an increase in the amount of arithmetic operations required for address calculations.

Therefore, by employing this configuration for the motion vector detection processing, the seventh embodiment can provide effects of suppressing the increase in the amount of occupied memory capacity, the increase in the data number of DMA transfer, and the increase in the amount of arithmetic operations (address calculations) at a processing employing a conventional address generating apparatus, and achieving greater advantages for the motion vector detection processing which is used in a small sized terminal with a limited amount of memory installed, particularly used in a radio portable terminal employing an image CODEC processing such as MPEG4, or used in a mode where a radio transmission/reception apparatus is connected to a computer.

Further, the seventh embodiment suppresses the amount of memory and can also be used for a scroll display in an image display when a scrolling direction is two-dimensional.

APPLICABILITY IN INDUSTRY

As described above, an address generating apparatus and a motion vector detector according to the present invention are suitable for automatically generating an address of a multidimensional area which does not run over a restricted area in a data memory set by a user, at the generation of an address for accessing an access object in a rectangular area, and are suitable for performing a motion vector detection by One at a time algorithm or the like, respectively.

What is claimed is:

1. An address generating apparatus comprising:

an addressing domain setting means for setting a successive addressing area which is determined by a top address and a final address, the top address having a value smaller than that of the final address;

a multidimensional address generating means which can successively generate addresses in a multidimensional area;

a first comparing means for comparing respective addresses subsequently generated by the multidimensional address generating means with the final address;

a second comparing means for comparing respective addresses subsequently generated by the multidimensional address generating means with the top address; and an address correction means for receiving the respective addresses subsequently generated by the multidimensional address generating means and the comparison results of the first and second comparing means as inputs, judging whether or not the respective addresses subsequently generated by the multidimensional address generating means run over the addressing domain set by the addressing domain setting means, based on the comparison results of the first and second comparing means, and correcting the respective addresses so that when an addressing domain exceeds the bottom row of a rectangular area to perform accesses to a subsequent downward row in the column direction, addresses are amended so that the addressing domain returns to the top row of the rectangular area to perform accesses toward sequentially downward rows, and when the addressing domain goes beyond the right edge of a row to perform accesses to further rightward columns in the row direction, addresses are amended so that the addressing domain returns to the beginning of a subsequent row of the rectangular area to perform accesses subsequently therefrom and output the comparison results when they exceed the addressing domain, and to output address of a subsequent cycle from a multidimensional address generating means as they are when they do not exceed the addressing domain.

2. The address generating apparatus as refined in claim 1, wherein the addressing domain setting means is configured such that the addressing domain sets the final address and the total data number and the top address is automatically generated by subtracting the total data number from the final address.

3. The address generating apparatus as defined in claim 1, wherein the multidimensional address generating means which can successively generate addresses in a multidimensional area comprises:

a means for setting a start address in a multidimensional area, incremental values in respective scanning directions, arid data numbers in respective scanning directions, and an independent cumulative register for accumulating addresses in respective scanning directions; and calculates an address value of a subsequent cycle by adding the incremental value corresponding to the scanning direction to the cumulative register corresponding to the scanning direction at an address calculation when the scanning direction is changed, to output the same, and updates the start address in the multidimensional area at a start cycle of addressing by the output of the address correction means.

4. The address generating apparatus as defined in claim 1, wherein the multidimensional address generating means which can successively generate addresses in a multidimensional area comprises:

a data number setting means for setting a start address in a multidimensional area, incremental values in respective scanning directions, and data numbers in respective scanning directions; and an independent cumulative register for accumulating addresses in respective scanning directions; and calculates an address value of a subsequent cycle by adding the incremental value corresponding to the scanning direction to the cumulative register corresponding to the scanning direction at an address calculation when the scanning direction is changed, to output the same, and among the cumulative registers for accumulating the addresses in respective scanning directions, a cumulative register in the lowest order scanning direction stores a corrected address outputted by the address correction means, while the other cumulative register stores one selected from the correction address outputted by the address correction means and the address value of a subsequent cycle, and the output of the cumulative register storing an address in the lowest scanning direction is taken out as output address.

5. The address generating apparatus as defined in claim 4, wherein the addressing domain setting means is configured such that the addressing domain sets the final address and the total data number, and the top address is automatically generated by subtracting the total data number from the final address.

6. The address generating apparatus as defined in claim 4, wherein the multidimensional address generating means generates a start address of the multidimensional area which is updated by the address output at a start cycle of addressing.

7. The address generating apparatus as defined in claim 1, wherein the multidimensional address generating means which can successively generate addresses in a multidimensional area comprises:

a data number setting means for setting a start address in a multidimensional area, incremental values in respective scanning directions, and data numbers in respective scanning directions; and: an independent cumulative register for accumulating addresses in respective scanning directions; and calculates an address value of a subsequent cycle by adding the incremental value corresponding to the scanning direction to the cumulative register corresponding to the scanning direction at an address calculation when the scanning direction is changed, to output the same, and among the cumulative registers for accumulating the addresses in respective scanning directions, a cumulative register in the lowest order scanning direction stores the address value of a subsequent cycle while other cumulative register stores one selected from the correction address outputted by the address correction means and the address value of a subsequent cycle, and that selected from the output of the cumulative register storing an address in the lowest order scanning direction and the address outputted by an address pointer of the address correcting means selected is taken out as an output address.

8. The address generating apparatus as defined in claim 7, wherein the addressing domain setting means is configured such that the addressing domain sets the final address and the total data number, and the top address is automatically generated by subtracting the total data number from the final address.

9. The address generating apparatus as defined in claim 7, wherein the start address of the multidimensional area is updated by the address output at a start cycle of addressing.

10. A motion vector detector at the motion vector detection processing performed by a processor comprising:

a memory outside a processor for storing image data;

an internal memory inside a processor for storing image data used for arithmetic operations for the motion vector detection only, employing direct memory access transfer from the memory outside the processor;

an arithmetic means for performing arithmetic operations for the motion vector detection; and an address generating apparatus as defined in claim 1 which generates an address for accessing a rectangular area of the internal memory.

11. An address generating apparatus comprising:

an addressing domain setting means for setting a successive addressing area which is determined by a top address and a final address;

a multidimensional address generating means which can successively generate addresses in a multidimensional area;

a first comparing means for comparing respective addresses subsequently generated by the multidimensional address generating means with the final address;

a second comparing means for comparing respective addresses subsequently generated by the multidimensional address generating means with the top address according to size;

an address detecting means for detecting to which of the top address or the final address, the address of a subsequent cycle is nearer based on the comparison result of the first comparing means and the comparison result of the second comparing means; and an address correction means for receiving the comparison results of the first and second comparing means, the output of the address detecting means, and the address of a subsequent cycle as inputs, judging whether or not the respective addresses subsequently generated by the multidimensional address generating means run over the addressing domain set by the addressing domain setting means, based on the comparison results of the first and second comparing means and the output of the address detection means, and correcting the respective addresses so that when an addressing domain exceeds the bottom row of a rectangular area to perform accesses to a subsequent downward row in the column direction, addresses are amended so that the addressing domain returns to the top row of the rectangular area to perform accesses toward sequentially downward rows, and when the addressing domain goes beyond the right edge of a row to perform accesses to further rightward columns in the row direction, addresses are amended so that the addressing domain returns to the beginning of a subsequent row of the rectangular area to perform accesses subsequently therefrom and output the comparison results when they exceed the addressing domain, and to output address of a subsequent cycle from a multidimensional address generating means as they are when they do not exceed the addressing domain.

* * * * *